US012719611B2

(12) United States Patent
Nishio et al.

(10) Patent No.: US 12,719,611 B2
(45) Date of Patent: Aug. 25, 2026

(54) BASE STATION, TERMINAL, AND COMMUNICATION METHOD USING INDICATION PATTERN DETERMINED BASED ON CONFIGURATION REGARDING FEEDBACK FOR RETRANSMISSION PROCESS

(71) Applicant: Panasonic Intellectual Property Corporation of America, Torrance, CA (US)

(72) Inventors: Akihiko Nishio, Osaka (JP); Hidetoshi Suzuki, Kanagawa (JP); Tomoya Nunome, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 315 days.

(21) Appl. No.: 18/294,894

(22) PCT Filed: Jul. 28, 2022

(86) PCT No.: PCT/JP2022/029186

§ 371 (c)(1),
(2) Date: Feb. 2, 2024

(87) PCT Pub. No.: WO2023/013522

PCT Pub. Date: Feb. 9, 2023

(65) Prior Publication Data

US 2024/0340106 A1 Oct. 10, 2024

(30) Foreign Application Priority Data

Aug. 5, 2021 (JP) ................................ 2021-129174

(51) Int. Cl.
*H04L 1/02* (2006.01)

(52) U.S. Cl.
CPC .................................... *H04L 1/02* (2013.01)

(58) Field of Classification Search
CPC ........................................................ H04L 1/02
(Continued)

(56) References Cited

U.S. PATENT DOCUMENTS 8,897,202 B2 * 11/2014 Chen ..................... H04B 7/155 370/464
8,908,604 B2 * 12/2014 Yuda .................. H04W 52/028 370/328

(Continued)

OTHER PUBLICATIONS

3GPP, "3rd Generation Partnership Project; Technical Specification Group Radio Access Network; Solutions for NR to support non-terrestrial networks (NTN) (Release 16)," 3GPP TR 38.821 V16.0.0, Dec. 2019. (140 pages).

(Continued)

*Primary Examiner* — Peter G Solinsky
(74) *Attorney, Agent, or Firm* — Seed Intellectual Property Law Group LLP

(57) ABSTRACT

A base station comprises a control circuit which determines a notification pattern based on settings pertaining to feedback about a re-transmission process and sets a notification pattern in a signal for reporting the allocated number of data in the re-transmission process, and a transmission circuit for transmitting the notification pattern in the signal, wherein: one or more of the plurality of patterns associated with a first candidate value for a value pertaining to the allocated number of data in the re-transmission process for which feedback is valid are associated with a second candidate value which is not included in the first candidate value; and the control circuit determines that one of the one or more patterns is the notification pattern, when it is reported that the value pertaining to the allocated number of data in the
(Continued)

re-transmission process for which feedback is valid is the second candidate value.

10 Claims, 18 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 12,519,571 | B2 * | 1/2026 | Kim | H04L 1/1812 |
| 2023/0179341 | A1 * | 6/2023 | Marinier | H04L 5/0055<br>370/328 |

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Physical layer procedures for control (Release 16)," 3GPP TS 38.213 V16.5.0, Mar. 2021. (184 pages).

3GPP, "3rd Generation Partnership Project; Technical Specification Group Radio Access Network; NR; Physical layer procedures for data (Release 16)," 3GPP TS 38.214 V16.5.0, Mar. 2021. (171 pages).

3GPP, "3rd Generation Partnership Project; Technical Specification Group Radio Access Network; Study on Scenarios and Requirements for Next Generation Access Technologies; (Release 16)," 3GPP TR 38.913 V16.0.0, Jul. 2020. (40 pages).

3GPP, "3rd Generation Partnership Project; Technical Specification Group Services and System Aspects; System Architecture for the 5G System; Stage 2 (Release 16)," 3GPP TS 23.501 v16.1.0, Jun. 2019. (367 pages).

CATT, "HARQ operation enhancement for NTN," R1-2100383, Agenda Item: 8.4.3, 3GPP TSG RAN WG1 #104-e, e-Meeting, Jan. 25-Feb. 5, 2021, 7 pages.

International Search Report, mailed Oct. 18, 2022, for International Application No. PCT/JP2022/029186, 4 pages. (With English Translation).

International Telecommunication Union (ITU), "IMT Vision—Framework and overall objectives of the future development of IMT for 2020 and beyond," Radiocommunication Sector of the ITU (ITU-R), M.2083-0, Geneva, Sep. 2015. (21 pages).

LG Electronics, "Discussions on HARQ enhancements in NTN," R1-2100705, Agenda item: 8.4.3, 3GPP TSG RAN WG1 #104-e, e-Meeting, Jan. 25-Feb. 5, 2021, 6 pages.

* cited by examiner

100

200

| DAI MSB, LSB | $V_{C\text{-}DAI}^{DL}$ or $V_{T\text{-}DAI}^{DL}$ | Number of {serving cell, PDCCH monitoring occasion}-pair(s) in which PDSCH transmission(s) associated with PDCCH or PDCCH indicating SPS PDSCH release or DCI format 1_1 indicating SCell dormancy is present, denoted as $Y$ and $Y \geq 1$ |
|---|---|---|
| 0,0 | 1 | $(Y-1)\,mod\,T_D+1=1$ |
| 0,1 | 2 | $(Y-1)\,mod\,T_D+1=2$ |
| 1,0 | 3 | $(Y-1)\,mod\,T_D+1=3$ |
| 1,1 | 4 | $(Y-1)\,mod\,T_D+1=4$ |

FIG. 8

No DCI assigning PDSCH of feedback-enabled HARQ-process for same HARQ-ACK timing prior to slot #0

| slot | #0 | #1 | #2 | #3 | #4 | #5 | #6 |
|---|---|---|---|---|---|---|---|
| HARQ feedback | **DISABLED** | ENABLED | ENABLED | **ENABLED** | ENABLED | ENABLED | **DISABLED** |
| PDCCH reception | OK | NG | NG | **OK** | NG | NG | OK |
| DAI codepoint | **00** | 00 | 01 | 10 | 11 | 00 | **00** |
| DAI value | **0** | 1 | 2 | 3 | 4 | 1 | **1** |
| gNB intention of #HARQ-ACKs | 0 | 1 | 2 | 3 | 4 | 5 | 5 |
| UE interpretation of #HARQ-ACKs | 0 | – | – | 0 | – | – | 5 |

Receive DCI assigning PDSCH of feedback-enabled HARQ-process for same HARQ-ACK timing in slot #3 earlier than slot #6

FIG. 10

No DCI with DAI codepoint other than “00” for same HARQ-ACK timing prior to slot #0

| slot | #0 | #1 | #2 | #3 | #4 | #5 | #6 | #7 |
|---|---|---|---|---|---|---|---|---|
| HARQ feedback | **DISABLED** | ENABLED | ENABLED | **DISABLED** | ENABLED | ENABLED | ENABLED | **DISABLED** |
| PDCCH reception | OK | NG | NG | **OK** | NG | NG | NG | OK |
| DAI codepoint | **00** | 00 | 01 | **01** | 10 | 11 | 00 | **00** |
| DAI value | **0** | 1 | 2 | 2 | 3 | 4 | **1** | **1** |
| gNB intention of #HARQ-ACKs | 0 | 1 | 2 | 2 | 3 | 4 | 5 | 5 |
| UE interpretation of #HARQ-ACKs | **0** | – | – | **2** | – | – | – | **5** |

Receive DCI with DAI codepoint other than “00” for same HARQ-ACK timing in slot #3 earlier than slot #7

FIG. 11

| slot | #0 | #1 | #2 | #3 | #4 | #5 |
| --- | --- | --- | --- | --- | --- | --- |
| HARQ feedback | ENABLED | DISABLED | ENABLED | ENABLED | ENABLED | ENABLED |
| PDCCH reception | NG | OK | **NG** | **NG** | **NG** | OK |
| DAI codepoint | 00 | 00 | 01 | 10 | 11 | 00 |
| DAI value (gNB intention value) | 1 | 1 | 2 | 3 | 4 | 1 |
| DAI value (UE interpretation value) | – | 0 | – | – | – | 1 |
| gNB intention of #HARQ-ACKs | 1 | 1 | 2 | 3 | 4 | 5 |
| UE interpretation of #HARQ-ACKs | – | 0 | – | – | – | 1 |

Inconsistency

FIG. 12

| slot | #0 | #1 | #2 | #3 | #4 | #5 |
|---|---|---|---|---|---|---|
| HARQ feedback | ENABLED | ENABLED | ENABLED | ENABLED | DISABLED | ENABLED |
| PDCCH reception | **NG** | **NG** | **NG** | **NG** | OK | OK |
| DAI codepoint | 00 | 01 | 10 | 11 | 11 | 00 |
| DAI value (gNB intention value) | 1 | 2 | 3 | 4 | 4 | 5 |
| DAI value (UE interpretation value) | – | – | – | – | 0 | 1 |
| gNB intention of #HARQ-ACKs | 1 | 2 | 3 | 4 | 4 | 5 |
| UE interpretation of #HARQ-ACKs | – | – | – | – | 0 | 1 |

Inconsistency

FIG. 13

| DAI MSB, LSB | $V_{C\text{-}DAI}^{DL}$ or $V_{T\text{-}DAI}^{DL}$ | Number of {serving cell, PDCCH monitoring occasion}-pair(s) in which PDSCH transmission(s) associated with PDCCH or PDCCH indicating SPS PDSCH release or DCI format 1_1 indicating SCell dormancy is present, denoted as $Y$ and $Y \geq 0$ |
|---|---|---|
| 0,0 | 1 | $(Y-1)\,mod\,T_D + 1 = 1$ |
| 0,1 | 2 | $(Y-1)\,mod\,T_D + 1 = 2$ |
| 1,0 | 3 | $(Y-1)\,mod\,T_D + 1 = 3$ |
| 1,1 | 4 | $(Y-1)\,mod\,T_D + 1 = 4$ |

FIG. 14

BASE STATION, TERMINAL, AND COMMUNICATION METHOD USING INDICATION PATTERN DETERMINED BASED ON CONFIGURATION REGARDING FEEDBACK FOR RETRANSMISSION PROCESS

TECHNICAL FIELD

The present disclosure relates to a base station, a terminal, and a communication method.

BACKGROUND ART

In the standardization of the 5th Generation mobile communication systems (5G), New Radio access technology (NR) was discussed in the 3rd Generation Partnership Project (3GPP), and specification of Release 15 (Rel. 15) of NR was published.

CITATION LIST

Non Patent Literature

NPL 1

3GPP, TR 38.821, V16.0.0 "Solutions for NR to support non-terrestrial networks (NTN) (Release 16)", 2019 December

NPL 2

3GPP, TS 38.213, V16.5.0 "NR; Physical layer procedures for control (Release 16)", 2021 March

NPL 3

3GPP, TS 38.214, V16.5.0 "NR; Physical layer procedures for data (Release 16)", 2021 March

SUMMARY OF INVENTION

There is scope for further study, however, on a method for improving retransmission control efficiency.

One non-limiting and exemplary embodiment facilitates providing a base station, a terminal, and a communication method each capable of improving retransmission control efficiency.

A base station according to an embodiment of the present disclosure includes: control circuitry, which, in operation, determines an indication pattern based on a configuration regarding feedback for a retransmission process and configures the indication pattern in a signal indicating a number of assignments of data in the retransmission process; and transmission circuitry, which, in operation, transmits the indication pattern in the signal, in which at least one of a plurality of patterns associated with a first candidate value for a value related to the number of assignments of data in a retransmission process in which the feedback is enabled is associated with a second candidate value not included in the first candidate value, and the control circuitry determines that at least one of the plurality of patterns is the indication pattern, when indicating that the value related to the number of assignments of data in a retransmission process in which the feedback is disabled is the second candidate value.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve retransmission control efficiency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 8 illustrates exemplary values configured in the DAI field;

FIG. 10 illustrates Example 1 of interpretation of DCI and a DAI bit sequence of the DCI for each slot;

FIG. 11 illustrates Example 2 of interpretation of DCI and a DAI bit sequence of the DCI for each slot;

FIG. 12 illustrates Example 3 of interpretation of DCI and a DAI bit sequence of the DCI for each slot;

FIG. 13 illustrates Example 4 of interpretation of DCI and a DAI bit sequence of the DCI for each slot;

FIG. 14 illustrates an exemplary indication method of a DAI value in Embodiment 2:

DESCRIPTION OF EMBODIMENTS

Embodiment 1

Figure 1:
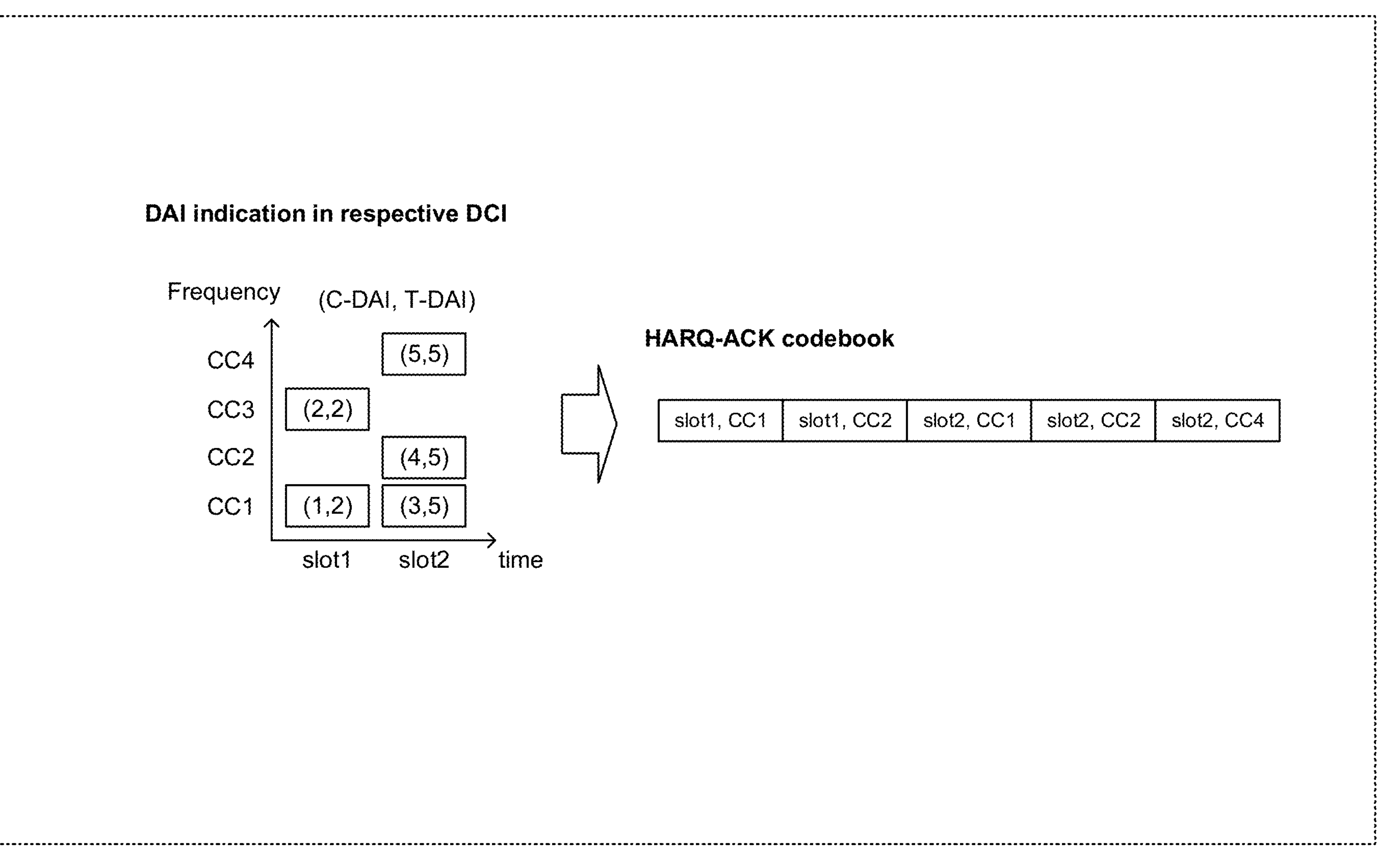
FIG. 1 illustrates exemplary downlink assignment index (DAI) and hybrid automatic repeat request-acknowledgement (HARQ-ACK) codebook.

Hereinafter, embodiments of the present disclosure will be described in detail with reference to the accompanying drawings.

[About Retransmission Control]

In long term evolution (LTE) or 5G NR, a hybrid automatic repeat request (HARQ) is applied to retransmission control during data transmission, for example.

In HARQ, a transmission side, for example, performs channel coding (forward error correction (FEC)), such as turbo-coding or low density parity check (LDPC) coding, on data and then transmits the coded data. During data decoding, a reception side, for example, saves (i.e., also referred to as buffers, stores, or holds) received data (e.g., soft determination value) in a buffer when the received data includes an error. Note that a buffer is also referred to as, for example, a HARQ soft buffer or simply a soft buffer. When receiving retransmitted data, the reception side combines (soft combines) the received data (e.g., retransmission data or data relating to retransmission request) and the previously received data (i.e., saved data), and decodes the combined data, for example. This allows the reception side to decode data using data with improved reception quality (e.g., signal to noise ratio (SNR)) in HARQ.

Meanwhile, in HARQ, the transmission side can improve coding gain by transmitting a parity bit different from that in the previous transmission (e.g., different redundancy version (RV)). Further, in HARQ, continuous data transmission is possible by using a plurality of processes (also called as HARQ processes or retransmission processes, for example) taking into account a propagation path delay and/or processing delays on the transmission side and the reception side. In this case, the reception side separates the received data by process ID (sometimes expressed as "PID" or "HARQ process ID"), which is identification information for identifying the process (or data), and saves the data in the buffer.

In LTE or NR, for example, a base station (also referred to as eNB or gNB, for example) indicates information on HARQ, such as a process ID, new data indicator (NDI), and RV, to a terminal (also referred to as user equipment (UE), for example) when assigning data. The terminal performs reception processing (e.g., software combining processing) on the data (e.g., physical downlink shared channel (PDSCH)) based on the information on HARQ indicated from the base station.

In addition, the terminal, for example, transmits (or feeds back) a response signal (hereinafter referred to as "HARQ-Acknowledgement (HARQ-ACK)" or HARQ information) indicating the presence or absence of an error in the received data to the base station. HARQ-ACK may be transmitted using, for example, an uplink control channel (e.g., physical uplink control channel (PUCCH)) or an uplink data channel (e.g., physical uplink shared channel (PUSCH)).

The base station may, for example, specify a slot (or a component carrier) in which the terminal transmits HARQ-ACK in downlink control information (DCI) that assigns PDSCHs.

Here, for example, in a case of time division duplex (TDD) system, uplink slots are configured (i.e., limited) to a part of time resources, and thus HARQ-ACKs for a plurality of respective PDSCHs are sometimes collectively transmitted in the same uplink slot. In other words, there may be a case where one or more PDSCHs for which timings (slots) of HARQ-ACK transmissions are the same are configured. In a frequency division duplex (FDD) system or the TDD system, for example, in a case of carrier aggregation (CA), HARQ-ACKs for a plurality of respective PDSCHs transmitted in a plurality of component carriers (CCs) or cells are sometimes collectively transmitted in a single CC of a single slot.

In such cases, the terminal may transmit, for example, a bit string of HARQ-ACK bits including a plurality of HARQ-ACKs (hereinafter referred to as a "HARQ-ACK codebook") in a PUCCH or PUSCH. The number of HARQ-ACK bits transmitted in a certain slot may vary depending on the number of PDSCH assignments, for example.

NR Rel. 15 or Rel. 16 (hereinafter, sometimes referred to as NR Rel. 15/16) specifies, for example, a type in which the size of HARQ-ACK codebook is semi-statically determined (hereinafter, referred to as "Type 1 HARQ-ACK codebook") and a type in which the size of HARQ-ACK codebook is dynamically determined (hereinafter, referred to as "Type 2 HARQ-ACK codebook") (see, e.g., section 9 of NPL 2).

In the Type 1 HARQ-ACK codebook, for example, by including a bit indicating negative acknowledgement (NACK) in a HARQ-ACK bit for a slot and/or CC with no PDSCH assignment, the size of HARQ-ACK codebook is configured to be constant regardless of PDSCH assignment.

In the Type 2 HARQ-ACK codebook, for example, HARQ-ACK bits for slots and/or CCs with PDSCH assignment are included in the HARQ-ACK codebook. In other words, in the Type 2 HARQ-ACK codebook, for example, a HARQ-ACK bit for a slot and/or CC with no PDSCH assignment is not included in the HARQ-ACK codebook. For example, the terminal determines the presence or absence of a HARQ-ACK bit for a PDSCH received in each slot and/or each CC based on whether DCI including information on PDSCH assignment is received in the slot and/or CC. Here, when the terminal fails to receive DCI (e.g., decoding error or error detection), for example, the terminal may make a mistake in determining the presence or absence of the HARQ-ACK bit, possibly causing disagreement in perception regarding HARQ (e.g., HARQ-ACK codebook size) between the base station and the terminal.

One way to align the perceptions between the base station and the terminal regarding HARQ is introduction of a downlink assignment index (DAI) indicated to the terminal by DCI assigning PDSCHs, for example. For example, DAI may indicate information on the number of PDSCH assignments to the terminal. The indication of DAI allows the terminal to specify the correct size of a HARQ-ACK codebook even when the terminal fails to receive DCI, for example. Note that the term "specify" may be replaced by another term such as "discriminate," "identify," "recognize," "determine," "estimate," or "interpretation."

For example, DAI includes a "Counter-DAI (C-DAI)" indicating the number of counts of slots and CCs with PDSCH assignment until the slot and CC where the DAI is indicated, and a "Total-DAI (T-DAI)" indicating the total number of PDSCH assignments until the slot.

In other words, C-DAI may indicate, for example, the cumulative number of pairs of slots and CCs (or pairs of serving cells and PDCCH monitoring occasions) with PDSCH reception (or PDSCH assignment) until the present CC and slot (or serving cell and PDCCH monitoring occasion). Meanwhile, T-DAI may indicate, for example, the total number of pairs of slots and CCs (or pairs of serving cells and PDCCH monitoring occasions) with PDSCH reception (or PDSCH assignment) until the present slot (or PDCCH monitoring occasion).

For example, C-DAI may be incremented at each PDSCH assignment in DCI in each slot and CC. For example, T-DAI may indicate the total number of PDSCH assignments until the slot (including the slot) where the DAI is indicated. Each of C-DAI and T-DAI may be represented by, for example, two bits. Note that C-DAI and T-DAI may be capable of counting four or more even though they are represented by two bits.

FIG. 1 illustrates exemplary DAIs (e.g., C-DAI and T-DAI) included in DCI assigning PDSCH and an exemplary HARQ-ACK codebook transmitted by the terminal.

In FIG. 1, the terminal may receive DCI including DAI (C-DAI, T-DAI) in any of slots (slot1 and slot2 in FIG. 1) and CCs (CC1 to CC4 in FIG. 1), for example. In the example illustrated in FIG. 1, for the terminal, PDSCHs are assigned in CC1 and CC3 of slot1, and PDSCHs are assigned in CC1, CC2, and CC4 of slot2. In this case, the terminal may receive, in the slots and CCs with PDSCH assignment, DAI including C-DAI indicating a count value of the number of PDSCH assignments and T-DAI indicating the total number of PDSCH assignments until the slot.

By way of example, a description will be given of a case where the terminal fails to receive DCI in CC1 of slot2 in FIG. 1. In this case, the terminal can identify that reception failure of DCI has occurred in CC1 of slot2 based on, for example, DAI (4, 5) received in CC2 of slot2. This allows the terminal to feed back a HARQ-ACK codebook including HARQ-ACK bits for the five PDSCHs assigned by the base station as illustrated in FIG. 1, for example. In this manner, DAI can prevent the terminal from misidentifying the size of the HARQ-ACK codebook.

[Extension to Non-Terrestrial Network (NTN)]

LTE and NR Rel. 15/16 have been specified as a radio access technology for terrestrial networks. Meanwhile, an extension of NR to a non-terrestrial network (NTN) such as communication using a satellite and/or a high-altitude platform station (HAPS) has been studied (e.g., NPL 1).

In the NTN environment, a coverage area (e.g., one or more cells) of a satellite for a terminal on the ground or a terminal located in airspace, such as an aircraft or drone, is formed by a beam from the satellite. In addition, a round trip time (RTT) of radio wave propagation between the terminal and the satellite is determined depending on the altitude of the satellite (e.g., approximately up to 36000 km) and the angle viewed from the terminal, that is, the positional relation between the satellite and the terminal.

For example, NPL 1 describes that the round trip time (RTT) of radio wave propagation between the base station and the terminal takes up to approximately 540 ms in the NTN.

For example, retransmission control is performed based on individual HARQ-ACK feedback to a HARQ process. Thus, in the NTN where the RTT is long compared to a terrestrial network, a large number of HARQ processes is possibly used for consecutive data transmissions. Further, for example, in the NTN, disabling HARQ-ACK feedback for the HARQ process individually is considered (e.g., see NPL 1).

For example, in a HARQ process for which feedback is enabled (e.g., feedback-enabled HARQ process), a terminal may transmit HARQ-ACK and a base station may perform scheduling based on the HARQ-ACK. Meanwhile, for example, in a HARQ process for which feedback is disabled (e.g., feedback-disabled HARQ process), a terminal transmits no HARQ-ACK and a base station may schedule the next data without waiting for reception of HARQ-ACK.

Here, in the above-described Type2 HARQ-ACK codebook (i.e., dynamic codebook), it may be assumed that a HARQ-ACK bit for a PDSCH of a feedback-enabled HARQ process is included in the HARQ-ACK codebook. In other words, in the above-described Type2 HARQ-ACK codebook, it may be assumed that a HARQ-ACK bit for a PDSCH of a feedback-disabled HARQ process is not included in the HARQ-ACK codebook.

It should be noted that the phrase "PDSCH of a feedback-enabled HARQ process" may be replaced with another phrase such as "PDSCH of a feedback-enabled-HARQ process" or "PDSCH in which feedback is enabled." Further, the phrase "PDSCH of a feedback-disabled HARQ process" may be replaced with another phrase such as "PDSCH of a feedback-disabled-HARQ process" or "PDSCH in which feedback is disabled."

In DCI scheduling (assigning) a PDSCH of a feedback-enabled HARQ process, a DAI (e.g., C-DAI and T-DAI) counting the number of assignments of PDSCHs of the feedback-enabled HARQ processes is indicated. However, indication of a DAI of DCI scheduling (assigning) a PDSCH of a feedback-disabled HARQ process has not been sufficiently studied.

For example, as one method, a method has been studied in which a DAI of DCI scheduling a PDSCH of a feedback-disabled HARQ process counts the number of assignments of PDSCHs of feedback-enabled HARQ processes.

However, in NR Rel. 15/16 specifications, the DAI counting starts from one, and there is no specification on indication for a case of no PDSCH assignment (e.g., case where the number of PDSCH assignments is zero).

Thus, there is scope for further study on indication of a DAI of DCI for indicating assignment of a PDSCH of a feedback-disabled HARQ process when a PDSCH of a feedback-disabled HARQ process is assigned before the assignment of a PDSCH of a feedback-enabled HARQ process for the same HARQ-ACK transmission timing.

One non-limiting embodiment of the present disclosure realizes enhancement of efficient retransmission control by indicating an appropriate DAI in DCI assigning a PDSCH of a feedback-disabled HARQ process when the DCI assigning the PDSCH of the feedback-disabled HARQ process is transmitted before DCI assigning a PDSCH of a feedback-enabled HARQ process for the same HARQ-ACK transmission timing.

Description will be herein given of assignment status where DCI assigning a PDSCH of a feedback-disabled HARQ process is transmitted before DCI assigning PDSCHs of feedback-enabled HARQ processes whose HARQ-ACK transmission timings are the same. The case corresponding to this assignment status may be a case where there is a slot in which DCI assigning a PDSCH of a feedback-disabled HARQ process is transmitted, prior to, in the time domain, a slot in which DCI assigning a PDSCH of a feedback-enabled HARQ process for the same HARQ-ACK transmission timing is transmitted. Further, it may be a case where DCI assigning a PDSCH of a feedback-enabled HARQ process has not been received until DCI assigning a PDSCH of a feedback-disabled HARQ process is received by the terminal.

Alternatively, the case corresponding to this assignment status may be a case where a slot in which DCI assigning a PDSCH of a feedback-disabled HARQ process is transmitted and a slot in which DCI assigning a PDSCH of a feedback-enabled HARQ process for the same HARQ-ACK transmission timing is transmitted are the same. However, in the above-described assignment status, when the slots are the same, a CC in which the DCI assigning the PDSCH of the feedback-disabled HARQ process is transmitted is present prior to a CC in which the DCI assigning the PDSCH of the feedback-enabled HARQ process is transmitted. Note that, for each CC, the order indicating the context and the like with each other is defined in advance by an index of CC, for example. Further, the slot may be read as a symbol.

Further, DCI may also be transmitted by a physical downlink control channel (PDCCH). A slot or symbol in which a PDCCH is transmitted may be referred to as a PDCCH monitoring occasion. In this case, the context of DCI transmission related to the above-described assignment status may be defined by an index of the PDCCH monitoring occasion.

Alternatively, it may be a case where a PDSCH of a feedback-disabled HARQ process is assigned prior to a slot in which a PDSCH of a feedback-enabled HARQ process for the same HARQ-ACK transmission timing is assigned.

Note that, the embodiments to be described below is for assignment status where DCI assigning a PDSCH of a feedback-disabled HARQ process is transmitted prior to the transmission of DCI assigning a PDSCH of a feedback-enabled HARQ process for the same HARQ-ACK transmission timing, but the present disclosure is not limited thereto.

It should be noted that, in one non-limiting embodiment of the present disclosure, the base station (transmission side) indicates each of a C-DAI and T-DAI that include no assignment of a PDSCH of a feedback-disabled HARQ process. The terminal (reception side) determines a HARQ-ACK codebook size based on the C-DAI and T-DAI. In DCI assigning the PDSCH of the feedback-disabled HARQ process, a predetermined DAI (C-DAI and/or T-DAI) is indicated when there is no assignment of a PDSCH of a feedback-enabled HARQ process for the same HARQ-ACK timing. Note that, the term "DAI" will be used in the following description and may be used for both C-DAI and T-DAI.

Note that DCI assigning a PDSCH of a feedback-enabled HARQ process may be referred to as DCI assigning a PDSCH of a HARQ process in which feedback is enabled, "DCI with HARQ feedback," or "DCI with feedback-enabled HARQ process." Further, DCI assigning a PDSCH of a feedback-enabled HARQ process may be referred to as DCI assigning a feedback-enabled PDSCH or DCI assigning a PDSCH in which feedback is enabled. Furthermore, a PDSCH of a feedback-enabled HARQ process is sometimes abbreviated as a feedback-enabled PDSCH or a feedback-enabled HARQ process.

In addition, DCI assigning a PDSCH of a feedback-disabled HARQ process may be referred to as DCI assigning a PDSCH of a HARQ process in which feedback is disabled, "DCI without HARQ feedback," or "DCI with feedback disabled HARQ process." A PDSCH of a feedback-disabled HARQ process is also sometimes abbreviated as a feedback-disabled PDSCH or a feedback-disabled HARQ process.

[Overview of Communication System]

A communication system according to an embodiment of the present disclosure includes base station 100 and terminal 200.

Figure 2:
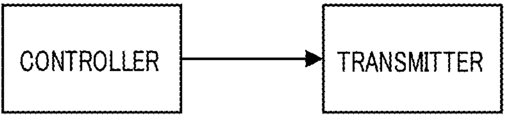
FIG. 2 is a block diagram illustrating an exemplary configuration of a part of a base station.

FIG. 2 is a block diagram illustrating an exemplary configuration of a part of base station 100. In base station 100 illustrated in FIG. 2, a controller (e.g., corresponding to control circuitry) determines information to be indicated (e.g., indication pattern), based on a configuration (e.g., enabled or disabled) regarding feedback for a retransmission process (e.g., HARQ process), and configures the indication pattern to a signal (e.g., DAI) indicating the number of data assignments in the retransmission process. A transmitter (e.g., corresponding to transmission circuitry) transmits, for example, the indication pattern in the above-described signal (e.g., DAI). At least one of a plurality of patterns associated with the first candidate value for a value related to the number of data assignments in a retransmission process in which feedback is enabled is associated with the second candidate value not included in the first candidate value. Then, when indicating that a value related to the number of data assignments in a retransmission process in which feedback is disabled is the second candidate value, the controller determines that any one of the at least one of the patterns is the indication pattern.

Figure 3:
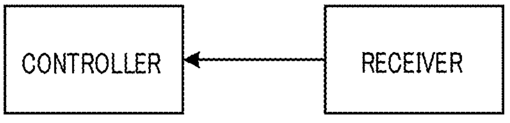
FIG. 3 is a block diagram illustrating an exemplary configuration of a part of a terminal.

FIG. 3 is a block diagram illustrating an exemplary configuration of a part of terminal 200. In terminal 200 illustrated in FIG. 3, a receiver (e.g., corresponding to reception circuitry) receives an indication pattern configured based on a configuration (e.g., enabled or disabled) regarding feedback for a retransmission process (e.g., HARQ process), in a signal (e.g., DAI) indicating the number of data assignments in the retransmission process. A controller (e.g., corresponding to control circuitry) controls the data reception based on the indication pattern. A predetermined pattern of a plurality of patterns associated with the first candidate values for a value related to the number of data assignments in a retransmission process in which feedback is enabled is associated with the second candidate value not included in the first candidate value. Then, when the indication pattern included in control information on a retransmission process in which feedback is disabled indicates the predetermined pattern, the controller determines a value related to the number of data assignments indicated by the predetermined pattern based on control information on the retransmission process in which feedback is enabled.

[Configuration of Base Station]

Figure 4:
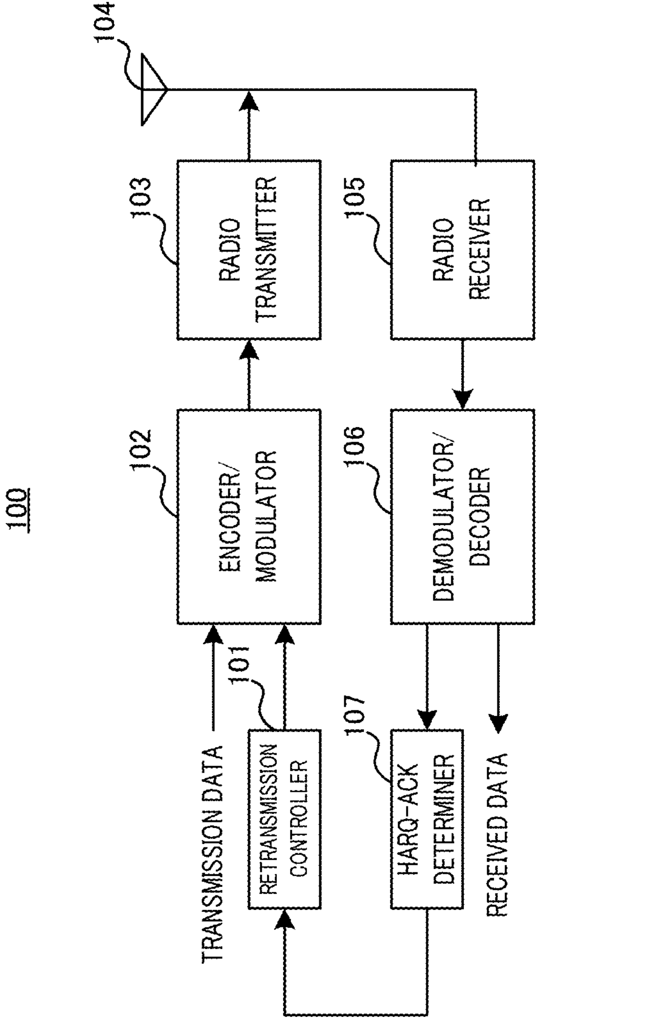
FIG. 4 is a block diagram illustrating an exemplary configuration of the base station.

FIG. 4 is a block diagram illustrating an exemplary configuration of base station 100 according to the present embodiment. Base station 100 includes, for example, retransmission controller 101, encoder/modulator 102, radio transmitter 103, antenna 104, radio receiver 105, demodulator/decoder 106, and HARQ-ACK determiner 107.

For example, at least one of retransmission controller 101, encoder/modulator 102, demodulator/decoder 106, and HARQ-ACK determiner 107 illustrated in FIG. 4 may be included in the controller illustrated in FIG. 2. In addition, radio transmitter 103 illustrated in FIG. 4 may be included in the transmitter illustrated in FIG. 2, for example.

Retransmission controller 101, for example, controls retransmission of transmission data (e.g., PDSCH). For example, retransmission controller 101 may generate information on retransmission control including at least one of a HARQ process ID, NDI, RV, information indicating HARQ-ACK transmission timing (e.g., PDSCH-to-HARQ_feedback timing indicator), and DAI (C-DAI, T-DAI) for transmission data. Retransmission controller 101 outputs the generated information on retransmission control to encoder/modulator 102. Note that a DAI generation method will be described later.

Here, for example, a HARQ-ACK feedback configuration (e.g., either feedback-enabled or feedback-disabled) and a HARQ process ID may be associated with each other in advance. Information on the association between the feedback configuration and the HARQ process ID may be indicated (or configured) to terminal 200 by, for example, higher layer signaling or downlink control information. Base station 100 may implicitly indicate either feedback-enabled or feedback-disabled to terminal 200 by indicating the HARQ process ID, for example. Note that the indication of the feedback configuration is not limited to the above example, and base station 100 may explicitly indicate information on the feedback configuration to terminal 200.

In addition, retransmission controller 101 may determine information (e.g., notification pattern) to be configured to a DAI field for each HARQ process based on the HARQ-ACK feedback configuration for the HARQ process, for example. An exemplary method for configuring a DAI field will be described later.

Further, for example, retransmission controller 101 may determine retransmission of transmission data (or transmission of new data) based on information inputted from HARQ-ACK determiner 107, and indicate whether retransmission of transmission data is performed to encoder/modulator 102.

For example, encoder/modulator 102 performs, on inputted transmission data (e.g., transport block), error correction coding such as turbo coding, LDPC coding, or polar coding, and modulation such as quarter phase shift keying (QPSK) or quadrature amplitude modulation (QAM), and outputs the modulated signal to radio transmitter 103.

Encoder/modulator 102 may, for example, store transmission data in a buffer. When retransmission controller 101 indicates retransmission, for example, encoder/modulator 102 may perform the same processing as described above on the transmission data (e.g., retransmission data) stored in the buffer. When retransmission controller 101 indicates no retransmission (or transmission of new data), for example, encoder/modulator 102 may delete corresponding transmission data stored in the buffer.

In addition, encoder/modulator 102, for example, encodes and modulates downlink control information (e.g., DCI) and outputs the modulated signal to radio transmitter 103. DCI may include, for example, data assignment information, such as time and frequency resource allocation information and information on a coding and modulation scheme (e.g., modulation and coding scheme (MCS) information), and information on retransmission control, such as a HARQ process ID, NDI, RV, PDSCH-to-HARQ_feedback timing indicator, or DAI (C-DAI, T-DAI) inputted from retransmission controller 101.

Here, in LTE and 5G NR, for example, the transmission data may correspond to PDSCH, and the data assignment information may correspond to DCI or PDCCH For example, radio transmitter 103 performs transmission processing such as D/A conversion, up-conversion, and amplification on the signal inputted from encoder/modulator 102, and transmits the radio signal after the transmission processing from antenna 104.

For example, radio receiver 105 performs reception processing such as down-conversion and A/D conversion on a data signal (e.g., PUSCH) and a control signal (e.g., HARQ-ACK information) from terminal 200 received via antenna 104, and outputs the signal after the reception processing to demodulator/decoder 106.

Demodulator/decoder 106 performs, for example, channel estimation, demodulation processing, and decoding processing on the received signal inputted from radio receiver 105. For example, demodulator/decoder 106 outputs received data when the received signal is data, and outputs HARQ-ACK information to HARQ-ACK determiner 107 when the received signal is HARQ-ACK information.

HARQ-ACK determiner 107, for example, determines whether there is an error (e.g., ACK or NACK) in each transmission data (e.g., transport block) that has been transmitted based on the HARQ-ACK information (e.g., HARQ-ACK codebook) inputted from demodulator/decoder 106. When the HARQ-ACK information is NACK, for example, HARQ-ACK determiner 107 may indicate retransmission of data to retransmission controller 101. When the HARQ-ACK information is ACK, for example, HARQ-ACK determiner 107 may indicate no retransmission of data to retransmission controller 101.

Note that, when the Type 2 HARQ-ACK codebook is configured to terminal 200, base station 100, for example, receives HARQ-ACK of the feedback-enabled HARQ process and does not receive HARQ-ACK of the feedback-disabled HARQ process. For example, HARQ-ACK determiner 107 may determine whether there is an error for the HARQ-ACK of the feedback-enabled HARQ process. Here, for example, which type of HARQ-ACK codebook is applied to each HARQ process may be indicated (or configured) in advance to terminal 200.

[Configuration of Terminal]

Next, an exemplary configuration of terminal 200 will be described.

Figure 5:
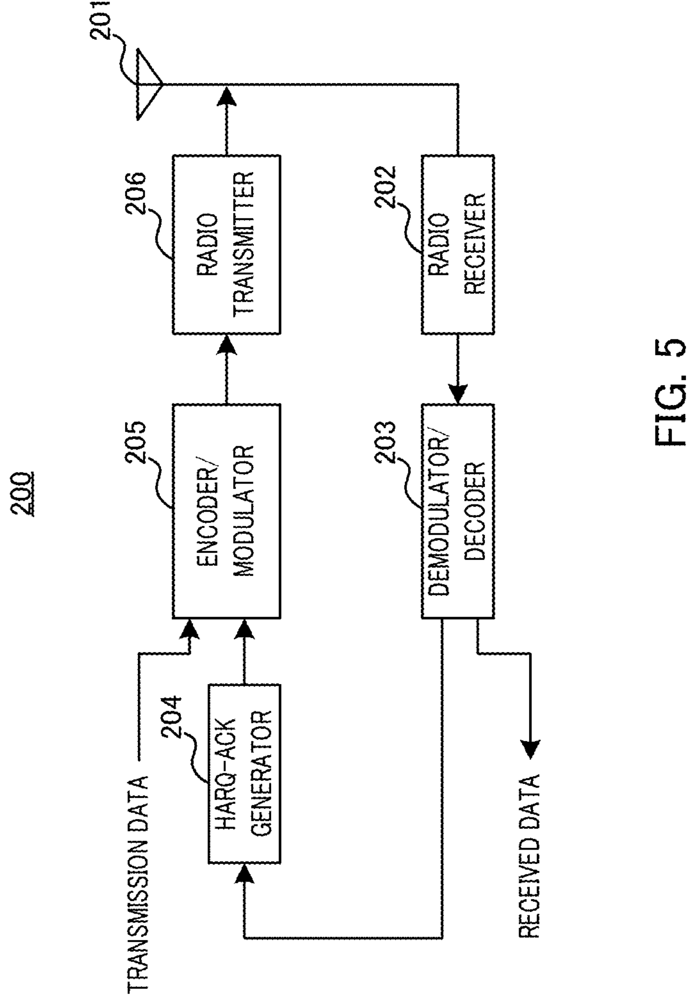
FIG. 5 is a block diagram illustrating an exemplary configuration of the terminal.

FIG. 5 is a block diagram illustrating an exemplary configuration of terminal 200 according to the present embodiment. Terminal 200 includes, for example, antenna 201, radio receiver 202, demodulator/decoder 203, HARQ-ACK generator 204, encoder/modulator 205, and radio transmitter 206.

For example, at least one of demodulator/decoder 203, HARQ-ACK generator 204, and encoder/modulator 205 illustrated in FIG. 5 may be included in the controller illustrated in FIG. 3. In addition, radio receiver 202 illustrated in FIG. 5 may be included in the receiver illustrated in FIG. 3, for example.

For example, radio receiver 202 performs reception processing such as down-conversion and A/D conversion on a data signal (e.g., PDSCH) and a control signal (e.g., PDCCH or DCI) from base station 100 received via antenna 201, and outputs the signal after the reception processing to demodulator/decoder 203.

Demodulator/decoder 203 performs, for example, channel estimation, demodulation processing, and decoding processing on the received signal inputted from radio receiver 202. For example, when the received signal is data, demodulator/decoder 203 may perform processing based on data assignment information (e.g., modulation scheme and coding rate) included in the control signal. Demodulator/decoder 203 may determine whether the received data is initial transmission data (or new data) or retransmission data, for example, based on NDI included in the control signal. In a case of initial transmission data, for example, demodulator/decoder 203 may perform error correction decoding and cyclic redundancy check (CRC) determination. In a case of retransmission data, for example, demodulator/decoder 203 may perform error correction decoding after combining the data stored in a buffer with the received data, and perform CRC determination. For example, demodulator/decoder 203 outputs the CRC determination result to HARQ-ACK generator 204.

HARQ-ACK generator 204 generates HARQ-ACK information (e.g., HARQ-ACK codebook) based on the CRC determination result inputted from demodulator/decoder 203, for example, and outputs the generated information to encoder/modulator 205.

HARQ-ACK generator 204 generates HARQ-ACK information (e.g., ACK or NACK) based on the CRC determination result, for example, for data of feedback-enabled HARQ process. For example, HARQ-ACK generator 204 generates ACK in a case of CRC OK (e.g., no error) and generates NACK in a case of CRC NG (Not Good, e.g., with error). In addition, when terminal 200 receives a plurality of transport blocks or code blocks, for example, HARQ-ACK generator 204 may generate HARQ-ACK for each of the plurality of transport blocks or code blocks and generate a HARQ-ACK code block composed of the plurality of HARQ-ACKs.

When the Type 1 HARQ-ACK codebook is configured, HARQ-ACK generator 204 may insert NACK into the HARQ-ACK codebook for slots and CCs with no data assignment, or for data of the feedback-disabled HARQ process, for example, regardless of a CRC decoding result.

When the Type 2 HARQ-ACK codebook is configured, HARQ-ACK generator 204 need not include HARQ-ACK in the HARQ-ACK codebook for slots and CCs with no data assignment, or for data of the feedback-disabled HARQ process, for example. In other words, HARQ-ACK generator 204 may include HARQ-ACK in the HARQ-ACK codebook, for slots and CCs with data assignment, or for data of the feedback-enabled HARQ process, for example.

For example, encoder/modulator 205 performs error correction coding and modulation processing on inputted transmission data (e.g., transport block), and outputs the modulated signal to radio transmitter 206. Encoder/modulator 205 also performs error correction coding and modulation processing on the HARQ-ACK information inputted from HARQ-ACK generator 204, for example, and outputs the modulated signal to radio transmitter 206.

For example, radio transmitter 206 performs transmission processing such as D/A conversion, up-conversion, and amplification on the signal inputted from encoder/modulator 205, and transmits the radio signal after the transmission processing from antenna 201.

Here, terminal 200 may transmit the HARQ-ACK information at a timing based on the PDSCH-to-HARQ_feedback timing indicator included in a control signal from base station 100, for example. In addition, terminal 200 may configure the size of the HARQ-ACK codebook, for example, based on a DAI (C-DAI, T-DAI) included in the DCI assigning PDSCHs for HARQ-ACK transmission timings.

[Exemplary Operations of Base Station and Terminal]

Next, exemplary operations of base station 100 and terminal 200 will be described.

Figure 6:
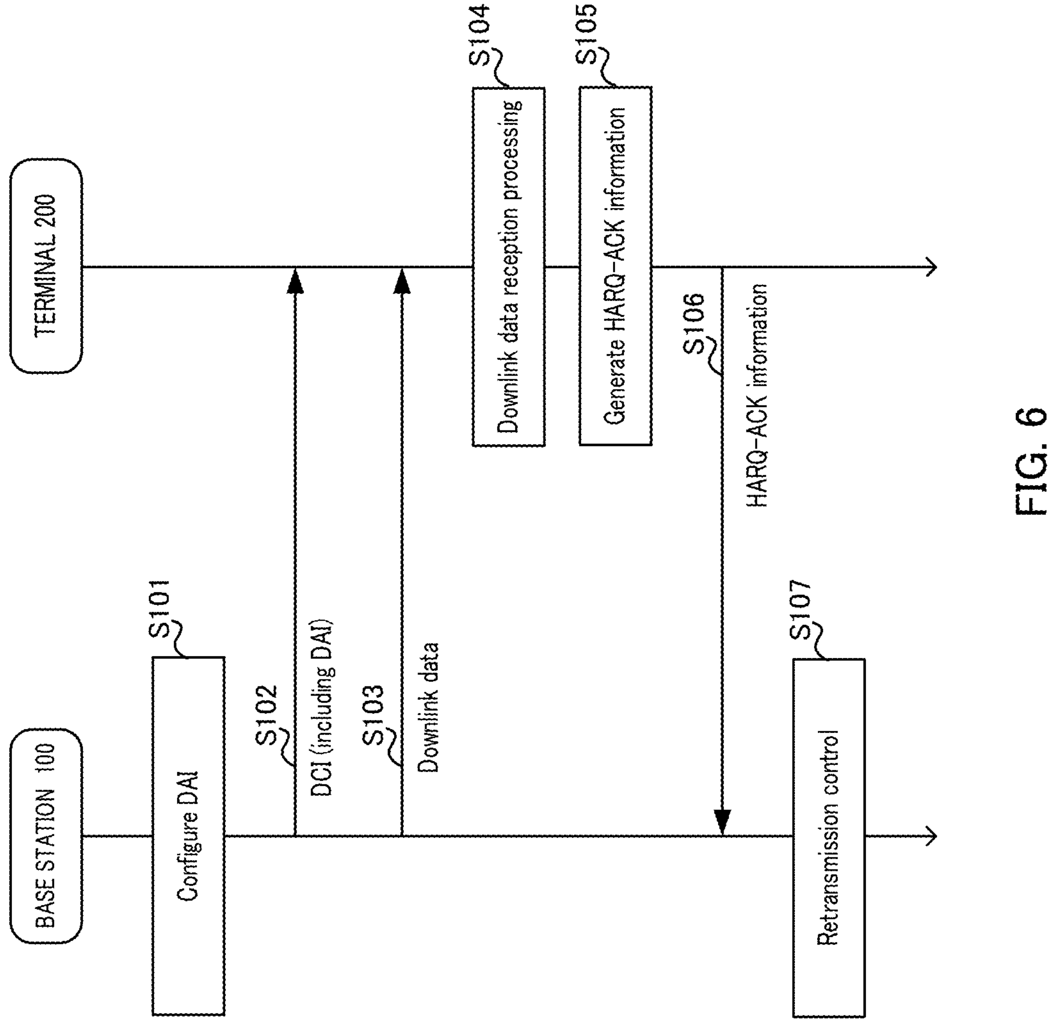
FIG. 6 is a sequence diagram describing exemplary operations of the base station and the terminal.

FIG. 6 is a sequence diagram describing exemplary operations of base station 100 and terminal 200 in the present embodiment.

In FIG. 6, base station 100 configures DAI (e.g., C-DAI and T-DAI) based on, for example, assignment of downlink data (e.g., PDSCH) for terminal 200 (S101). Base station 100 determines, for example, an indication pattern based on a configuration regarding each feedback for a HARQ process corresponding to PDSCH assignment (e.g., either feedback-enabled or feedback-disabled) and configure the indication pattern to a DAI field in the HARQ process. An exemplary configuration of a DAI will be described later.

Base station 100 transmits, for example, DCI including DAI to terminal 200 (S102). Terminal 200 receives the DCI including DAI from base station 100.

Base station 100 transmits downlink data to terminal 200 (S103), for example. Terminal 200 may receive the downlink data, for example, based on data assignment information included in the DCI.

Terminal 200 may perform reception processing, such as error correction decoding and CRC determination, on the received downlink data (S104). For example, terminal 200 may control the reception processing (e.g., determination of the size of a HARQ-ACK codebook) for the downlink data (e.g., data for a feedback-disabled HARQ process) based on a DAI (e.g., at least one of C-DAI and T-DAI) for the feedback-disabled HARQ process.

Terminal 200 may generate HARQ-ACK information based on, for example, a result of the downlink data reception processing (e.g., CRC determination result) (S105). For example, terminal 200 may generate a HARQ-ACK codebook including HARQ-ACK for downlink data for a feedback-enabled HARQ process. In other words, terminal 200 need not include HARQ-ACK information for downlink data for a feedback-disabled HARQ process in a HARQ-ACK codebook.

Terminal 200 transmits the generated HARQ-ACK information (e.g., HARQ-ACK codebook) to base station 100 (S106).

Base station 100 performs retransmission control based on the HARQ-ACK information transmitted from terminal 200 (S107).

Next, a DAI configuration method according to Embodiment 1 (e.g., exemplary information configured to a DAI field) will be described.

<DAI Configuration Method>

In the DAI configuration method, a C-DAI field in DCI assigning a PDSCH of a feedback-enabled HARQ process may include, as specified in NPL 2, a C-DAI value indicating a count value of slots and CCs with data assignment (or a count value of the number of data assignments) up to the slot and CC in which the DAI is indicated, for example. Further, in the configuration method according to the present embodiment, a T-DAI field in DCI assigning a PDSCH of a feedback-enabled HARQ process may include, as specified in NPL 2, a T-DAI value indicating the total number of data assignments up to the slot in which the DAI is indicated, for example.

Further, in the DAI configuration method, a C-DAI field and a T-DAI field in DCI assigning a PDSCH of a feedback-disabled HARQ process may respectively include a C-DAI value and a T-DAI value similarly to the C-DAI field and the T-DAI field in the DCI assigning a PDSCH of a feedback-enabled HARQ process, for example, The C-DAI and T-DAI values in this case may be, for example, values that do not count (i.e., do not include) the assignment of a PDSCH (example of data) of a feedback-disabled HARQ process.

For example, base station 100 may configure information (e.g., C-DAI and T-DAI values) on the number of data assignments in a feedback-enabled HARQ process in signals (e.g., C-DAI and T-DAI fields) for a feedback-disabled HARQ process. For example, the C-DAI and T-DAI fields in DCI assigning a PDSCH of a feedback-disabled HARQ process may be configured with C-DAI and T-DAI values of the feedback-enabled HARQ process immediately before the assignment of the feedback-disabled HARQ process.

Figure 7:
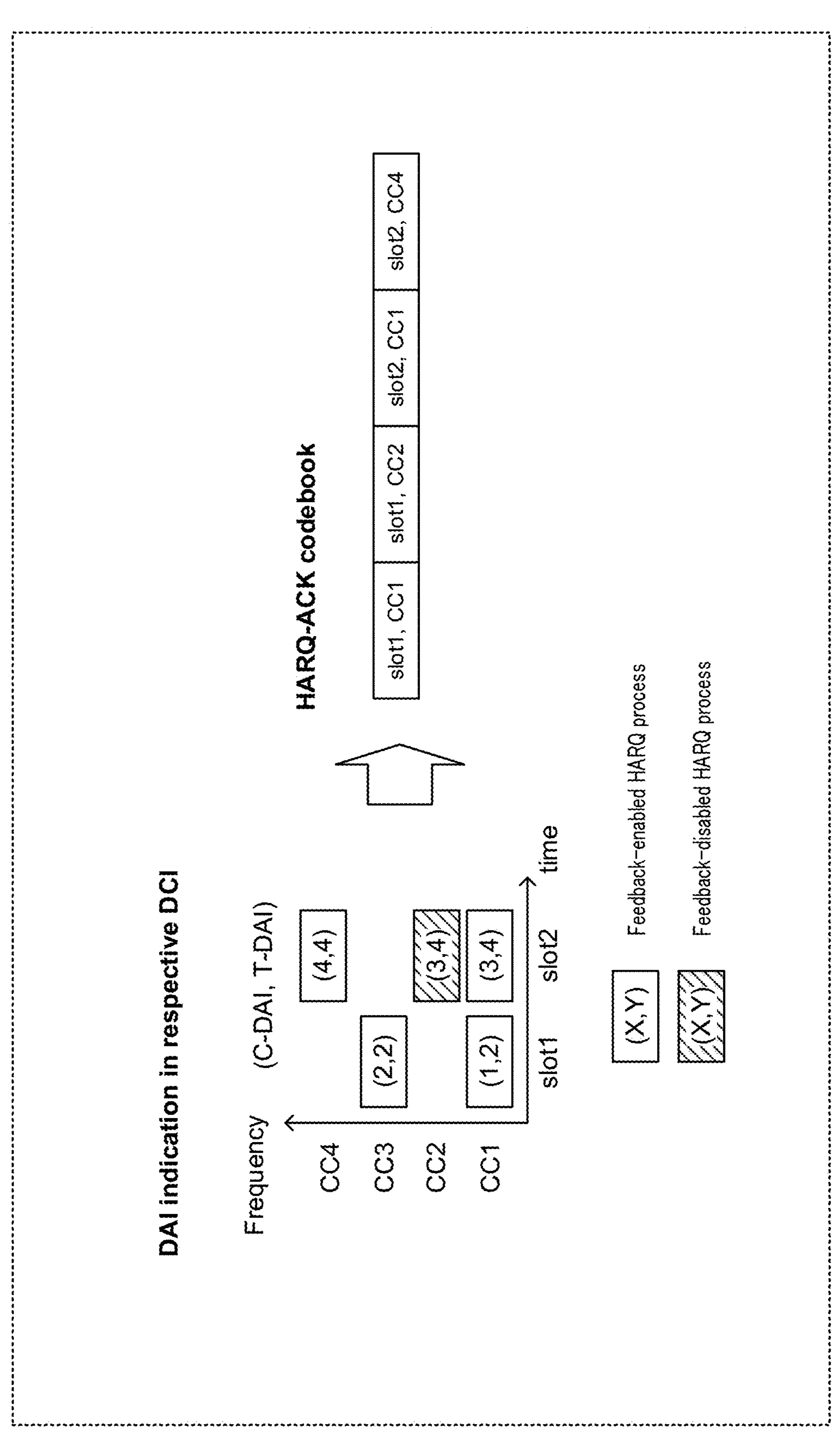
FIG. 7 illustrates Example 1 of a DAI field and a HARQ-ACK codebook.

FIG. 7 illustrates Example 1 of a DAI field and a HARQ-ACK codebook. FIG. 8 illustrates exemplary values configured in the DAI field. FIG. 8 is based on Table 9.1.3-1 of NPL 2, for example.

In the example illustrated in FIG. 7, DCI assigning a PDSCH of a feedback-enabled HARQ process is transmitted and received in CC1 and CC3 of slot1 and CC1 and CC4 of slot2, and DCI assigning a PDSCH of a feedback-disabled HARQ process is transmitted and received in CC2 of slot2.

FIG. 8 illustrates a relationship between Y and $T_D$, a DAI value ($V^{DL}_{C\text{-}DAI}$ and $V^{DL}_{T\text{-}DAI}$), and a bit sequence configured in the DAI field. Y represents the number of PDSCH assignments (e.g., the number of HARQ-ACKs). $T_D$ is a value defined by, for example, the number of bits of the DAI field. When the DAI field is two bit, $T_D$=4.

The C-DAI and T-DAI values illustrated in FIG. 7 are each a value ($V^{DL}_{C\text{-}DAI}$ and $V^{DL}_{T\text{-}DAI}$) converted based on the table illustrated in FIG. 8. When the C-DAI and T-DAI values are based on FIG. 8, the C-DAI value ($V^{DL}_{C\text{-}DAI}$) and the T-DAI value ($V^{DL}_{T\text{-}DAI}$) each take any value of 1, 2, 3, and 4. When the C-DAI and T-DAI values are based on modulo arithmetic of FIG. 8, the C-DAI and T-DAI values each increase in the order of 1, 2, 3, and 4 depending on an increase in the number of counts, and return to 1 after 4. Note that the data assignment may be regarded as PDSCH assignment. Note that, as illustrated in FIG. 8, a bit sequence ("DAI MSB, LSB" in FIG. 8) corresponding to the C-DAI and T-DAI values may correspond to an exemplary indication pattern configured in the DAI field.

As illustrated in FIG. 7, base station 100 may configure, in DCI assigning a PDSCH of a feedback-enabled HARQ process, a C-DAI value indicating a count value (or cumulative number) of data assignments for each CC and slot (in other words, for each pair of a CC and a slot), and a T-DAI value indicating the total number of data assignments for each slot.

Here, base station 100 need not count the data assignment of a feedback-disabled HARQ process in configuring the C-DAI value of the DCI assigning a PDSCH of a feedback-enabled HARQ process, for example. In addition, base station 100 need not count the data assignment of a feedback-disabled HARQ process in configuring the T-DAI value of the DCI assigning a PDSCH of a feedback-enabled HARQ process, for example. In other words, base station 100 may count the data assignments except for the data assignment of a feedback-disabled HARQ process in configuring the C-DAI and T-DAI values in a feedback-enabled HARQ process For example, in FIG. 7, in the DCI assigning a feedback-enabled HARQ process, the T-DAI value may be set to 2 in slot1, and the T-DAI value may be set to 4 in slot2 without counting the assignment of the PDSCH of the feedback-disabled HARQ process in CC2 of slot2. Further, in FIG. 7, for example, in the DCI assigning a PDSCH of a feedback-enabled HARQ process, the C-DAI value may be set without counting (in other words, without incrementing) the assignment of the PDSCH of the feedback-disabled HARQ process in CC2 of slot2.

Meanwhile, base station 100 may set the same values as the C-DAI and T-DAI values of the feedback-enabled HARQ process, for example, in the C-DAI and T-DAI fields of the DCI assigning the PDSCH of a feedback-disabled HARQ process without counting the assignment of the PDSCH of the feedback-disabled HARQ process. For example, in FIG. 7, the C-DAI and T-DAI values in CC2 of slot2 may be set to the same values ((C-DAI value, T-DAI value)=(3, 4) in FIG. 7) as the C-DAI and T-DAI values in the previous assignment in CC1 of slot2.

For example, terminal 200 need not include a HARQ-ACK for the PDSCH of a feedback-disabled HARQ process in a HARQ-codebook. Meanwhile, terminal 200 may determine the size of the HARQ-codebook including HARQ-ACKs for feedback-enabled HARQ processes, for example, based on information of the C-DAI and T-DAI fields of DAI included in the DCI assigning the PDSCH of the feedback-disabled HARQ process.

By way of example, a description will be given of a case where terminal 200 fails to receive DCI in CC1 of slot2 in FIG. 7. In this case, terminal 200 can determine that a DCI reception failure has occurred in CC1 of slot2 where data in the feedback-enabled HARQ process is assigned, based on, for example, DAI (3, 4) of the feedback-disabled HARQ process received in CC2 of slot2. In other words, terminal 200 can determine that there is an assignment of a PDSCH of a feedback-enabled HARQ process in CC1 of slot2 based on the DAI (3, 4) received in CC2 of slot2. Thus, as illustrated in FIG. 7, terminal 200 can determine the size of the HARQ-ACK codebook that includes four feedback-enabled HARQ-ACK bits.

Thus, in the above-described DAI configuration method, for example, terminal 200 may be capable of identifying a HARQ-codebook size based on information (e.g., C-DAI and T-DAI values) configured in C-DAI and T-DAI fields of DCI assigning a PDSCH of a feedback-disabled HARQ process even when reception failure (or reception error) of DCI assigning a PDSCH of a feedback-enabled HARQ process occurs, for example. This reduces the probability of disagreement in HARQ-codebook size recognition between base station 100 and terminal 200.

Further, in the above-described DAI configuration method, the same DCI size can be configured between DCI assigning a PDSCH of a feedback-disabled HARQ process and DCI assigning a PDSCH of a feedback-enabled HARQ process, which suppresses an increase in blind decoding during PDCCH reception in terminal 200.

Regarding the DCI assigning a PDSCH of a feedback-disabled HARQ process, there is possibly no assignment of PDSCHs of feedback-enabled HARQ processes whose HARQ-ACK timings are the same, prior to the assignment of a PDSCH of a feedback-disabled HARQ process.

Figure 9:
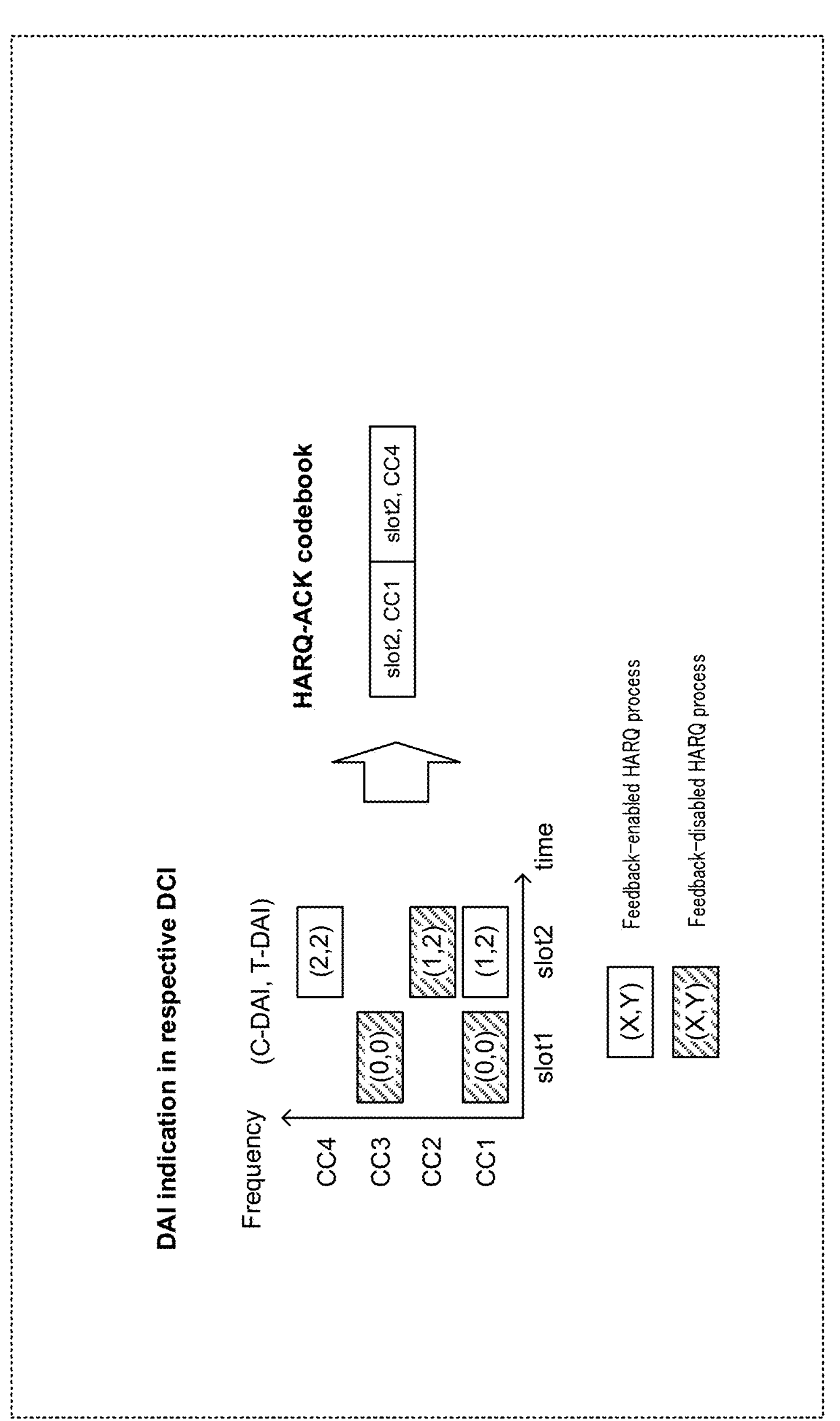
FIG. 9 illustrates Example 2 of the DAI field and the HARQ-ACK codebook.

FIG. 9 illustrates Example 2 of a DAI field and a HARQ-ACK codebook. FIG. 9 illustrates exemplary DCI transmitted and received in four CCs of CC1, CC2, CC3, and CC4 in slot1 and slot2, as in FIG. 7. In the example illustrated in FIG. 9, DCI assigning PDSCHs of feedback-disabled HARQ processes is transmitted and received in CC1 and CC3 of slot1 and CC2 of slot2, and DCI assigning PDSCHs of feedback-enabled HARQ processes is transmitted and received in CC1 and CC4 of slot2.

In the example illustrated in FIG. 9, there is no assignment of a PDSCH of a feedback-enabled HARQ process in slot1. Thus, the DAI value in CC1 and CC3 of slot1 is (0, 0).

However, since a DAI value takes a value of one or more according to the definition of the table illustrated in FIG. 8, an indication content should be separately defined for the above case, that is, a case where DAI value=0.

In Embodiment 1, predetermined information (e.g., predetermined bit sequence) of a DAI field is associated with DAI value=0, and DAI value=0 is indicated using the predetermined bit sequence. A reception side (e.g., terminal 200) interprets the predetermined bit sequence of the DAI field as DAI value=0. A method of indicating DAI value=0 will be described hereinafter.

<DAI Indication Method 1 in Embodiment 1>

In Embodiment 1, exemplarily, in DCI assigning a PDSCH of a feedback-disabled HARQ process, predetermined information (e.g., predetermined bit sequence) is configured in a DAI field when there is no assignment of a PDSCH of a feedback-enabled HARQ process for the same HARQ-ACK timing prior to the assignment of the PDSCH of the feedback-disabled HARQ process.

In other words, the predetermined information (e.g., predetermined bit sequence) is associated with DAI value=0. Note that the predetermined information (e.g., predetermined bit sequence) is also associated with a specified value (e.g., DAI value different from 0) of NR Rel. 15/16 described in NPL 2.

Note that, in the following description, a bit sequence configured in a DAI field will be sometimes referred to as a "DAI bit sequence." Further, a bit sequence configured in a DAI field being "00" will be sometimes referred to as "DAI bit sequence "00"." Furthermore, a value obtained based on the bit sequence configured in the DAI field will be sometimes referred to as a "DAI value." A value obtained based on the bit sequence configured in the DAI field being x will be sometimes referred to as "DAI value=x." For example, indicating, by DCI, that the DAI value is x corresponds to indicating DAI value=x.

Further, in some cases, DCI including a DAI field in which a certain bit sequence is configured will be referred to as DCI indicating the DAI bit sequence, DCI including the DAI bit sequence, or DCI of the DAI bit sequence. In addition, a DAI value indicated by a DAI field included in a certain DCI will be sometimes referred to as a DAI value indicated by the DCI, a DAI value included in the DCI, or a DAI value of the DCI. Further, in some cases, DCI including a DAI field in which a certain DAI value is configured will be referred to as DCI indicating the DAI value, DCI including the DAI value, or DCI of the DAI value.

In DAI indication method 1 according to the present embodiment, a bit sequence "00" is set in a DAI field as an exemplary predetermined bit sequence. Then, DCI including the set DAI field is indicated from base station 100 to terminal 200. Note that the bit sequence may be one bit or a plurality of bits. The bit sequence may be mutually replaced with another term such as a bit pattern, a (control) information series, (control) information, or a (control) information pattern.

As illustrated in FIG. 8, a bit sequence "00" is associated with DAI value=1, a bit sequence "01" is associated with DAI value=2, a bit sequence "10" is associated with DAI value=3, and a bit sequence "11" is associated with DAI value=4. For example, DAI values=1 to 4 are candidates for a values indicated by DCI assigning a PDSCH of a feedback-enabled HARQ process. Then, in DAI indication method 1, a bit sequence "00" is associated with DAI value=0. DAI value=0 is a value not included in the candidates for the value indicated by DCI assigning a PDSCH of a feedback-enabled HARQ process.

The bit sequence "00" is associated with DAI value=0 and DAI value=1, so that, when a bit sequence "00" is indicated in a DAI field of DCI assigning a PDSCH of a feedback-disabled HARQ process, terminal 200 interprets (determines) the DAI value indicated by the bit sequence "00." For example, interpretation of the DAI value indicated by the bit sequence configured in the DAI field may be changed depending a predetermined condition such as assignment status of DCI indicating the same HARQ-ACK timing.

For example, the examples of the predetermined condition include the following.

When

A condition that there is no assignment of a PDSCH of a feedback-enabled HARQ process for the same HARQ-ACK timing (hereinafter, referred to as the "first condition"), and A condition that DCI that assigns a PDSCH for the same HARQ-ACK timing and whose DAI bit sequence is other than a predetermined bit sequence ("00" in DAI indication method 1) is not received (hereinafter, referred to as the "second condition")

are satisfied, the predetermined bit sequence "00" is interpreted as DAI=0.

On the other hand, when

A condition that there is an assignment of a PDSCH of a feedback-enabled HARQ process for the same HARQ-ACK timing (hereinafter, referred to as the "third condition"), or A Condition that DCI that assigns a PDSCH for the same HARQ-ACK timing and whose DAI bit sequence is other than a predetermined bit sequence ("00" in DAI indication method 1) is received (hereinafter, referred to as the "fourth condition")

is satisfied, the predetermined bit sequence "00" is interpreted as DAI=1 (that is, a specified value of NR Rel. 15/16).

Note that, on each of the above-described conditions, whether to be satisfied may be determined based on assignment status and/or DCI reception status before reception of the DAI bit sequence "00" of the interpretation target.

Note that the third condition being satisfied corresponds to that the first condition is not satisfied. Further, the fourth condition being satisfied corresponds to that the second condition is not satisfied.

In other words, when both the first and second conditions are satisfied, the DAI bit sequence "00" may be interpreted as DAI value=0. When at least one of the third and fourth conditions is satisfied, in other words, when one of the first and second conditions is not satisfied, the DAI bit sequence "00" may be interpreted as DAI value=1.

Note that, in the interpretation of whether the C-DAI value is 0 when a bit sequence of the C-DAI field (hereinafter, referred to as "C-DAI bit sequence") is "00," a DAI bit sequence to be the target of the determination of whether the second and fourth conditions are satisfied may be the C-DAI bit sequence, for example. Alternatively, in the interpretation of whether the C-DAI value is 0 when the C-DAI bit sequence is "00," a DAI bit sequence to be the target of the determination of whether the second and fourth conditions are satisfied may be either one or both of the C-DAI bit sequence and a bit sequence of the T-DAI bit field (hereinafter, referred to as "T-DAI bit sequence").

Further, in the interpretation of whether the T-DAI value is 0 when the T-DAI bit sequence is "00," a DAI bit sequence to be the target of the determination of whether the second and fourth conditions are satisfied may be the T-DAI bit sequence, for example. Alternatively, in the interpretation of whether the T-DAI value is 0 when the T-DAI bit sequence is "00," a DAI bit sequence to be the target of the determination of whether the second and fourth conditions are satisfied may be either one or both of the C-DAI bit sequence and the T-DAI bit sequence.

When interpreting that DAI value=0, terminal 200 may generate a HARQ-ACK codebook defined in section 9.1.3 of NPL 2 based on DAI value=0.

As described above, two conditions of the first condition and the second condition may be used at the same time, or one of the two conditions may be used. For example, the DAI bit sequence "00" is interpreted as DAI value=0 when the first condition is satisfied, and the DAI bit sequence "00" is interpreted as DAI value=1 when the first condition is not satisfied (that is, when the third condition is satisfied). Alternatively, the DAI bit sequence "00" is interpreted as DAI value=0 when the second condition is satisfied, and the DAI bit sequence "00" is interpreted as DAI value=1 when the second condition is not satisfied (that is, when the fourth condition is satisfied).

Further, a condition different from the first to fourth conditions may be used, or the condition different from the first to fourth conditions may be used in combination with any one or more of the first to fourth conditions.

Further, the processing may be performed in time series for each slot, or, when a plurality of frequencies (component carriers) are used, the processing may be performed in ascending order of frequency indexes.

FIG. 10 illustrates Example 1 of interpretation of DCI and a DAI bit sequence of the DCI for each slot. FIG. 10 illustrates DCI assigning PDSCHs for the same HARQ-ACK timings, reception success/failure, and interpretation of a DAI value. Note that FIG. 10 illustrates an example where one CC is used.

For example, the "HARQ feedback" in FIG. 10 indicates that a PDSCH assignment by DCI received in each of slot #0 to slot #6 is an assignment of a feedback-enabled HARQ process or an assignment of a feedback-disabled HARQ-process.

The "PDCCH reception" in FIG. 10 indicates whether terminal 200 has successfully received or failed to receive a PDCCH (e.g., DCI) in each of slot #0 to slot #6.

The "DAI codepoint" in FIG. 10 indicates a DAI bit sequence of DCI transmitted from base station 100 in each of slot #0 to slot #6.

The "DAI value" in FIG. 10 indicates a DAI value indicated by the DAI bit sequence of DCI in each of slot #0 to slot #6. Note that the "DAI value" in FIG. 10 may be a DAI value based on the interpretation by terminal 200.

The "gNB intention of #HARQ-ACKs" in FIG. 10 indicates the number of HARQ-ACKs (e.g., the number of PDSCHs of feedback-enabled HARQ processes) intended by base station 100 (e.g., gNB).

The "UE intention of #HARQ-ACKs" in FIG. 10 indicates the number of HARQ-ACKs (e.g., the number of PDSCHs of feedback-enabled HARQ processes) intended by terminal 200 (e.g., UE).

In slot #0, terminal 200 receives DCI assigning a feedback-disabled PDSCH. In FIG. 10, the DAI bit sequence of DCI received in slot #0 is "00."

In this case, terminal 200 has not received DCI assigning a feedback-enabled PDSCH before slot #0 and has not received DCI whose DAI bit sequence does not correspond to DAI value=0. In other words, at least the first condition and the second condition are satisfied in this case. Thus, terminal 200 interprets that the DAI value indicated by the DAI bit sequence "00" of DCI received in slot #0 is 0.

Further, in slot #6, terminal 200 receives DCI assigning a feedback-disabled PDSCH. In FIG. 10, the DAI bit sequence of DCI received in slot #6 is "00."

In this case, terminal 200 has received DCI assigning a feedback-enabled PDSCH (or has received DCI whose DAI bit sequence does not correspond to DAI value=0) in slot #3 that is earlier than slot #6. In other words, at least the third condition is satisfied (at least the first condition is not satisfied) in this case. Thus, terminal 200 interprets that the DAI value indicated by the DAI bit sequence "00" of DCI received in slot #6 is 1.

FIG. 11 illustrates Example 2 of interpretation of DCI and a DAI bit sequence of the DCI for each slot. Similarly to FIG. 10, FIG. 11 illustrates DCI assigning PDSCHs for the same HARQ-ACK timings, reception success/failure, and interpretation of a DAI value. For items of the table illustrated in FIG. 11, description of the same items as those in FIG. 10 is omitted.

In slot #0, terminal 200 receives DCI assigning a feedback-disabled PDSCH. In FIG. 11, the DAI bit sequence of DCI received in slot #0 is "00."

In this case, terminal 200 has not received DCI assigning a feedback-enabled PDSCH before slot #0 and has not received DCI whose DAI bit sequence does not correspond to DAI value=0. In other words, at least the first condition and the second condition are satisfied in this case. Thus, terminal 200 interprets that the DAI value indicated by the DAI bit sequence "00" of DCI received in slot #0 is 0.

Further, in slot #7, terminal 200 receives DCI assigning a feedback-disabled PDSCH. In FIG. 11, the DAI bit sequence of DCI received in slot #7 is "00."

In this case, terminal 200 has received DCI that assigns a feedback-disabled PDSCH and whose DAI bit sequence indicates a DAI value different from 0 ("01" in FIG. 11) in slot #3 that is earlier than slot #7. In other words, at least the fourth condition is satisfied (at least the second condition is not satisfied) in this case. Thus, terminal 200 interprets that the DAI value indicated by the DAI bit sequence "00" of DCI received in slot #7 is 1.

According to above-described DAI indication method 1 of Embodiment 1, it is possible to indicate that a DAI value is 0 without adding a new bit to the DAI field and without increasing overhead of control information. Further, it is possible to configure a HARQ-ACK codebook and/or specify the number of bits by the same method as the method (e.g., mathematical expression) defined in NR Rel.15/16 described in NPL 2, so that NR Rel. 15/16 can be reused as a base station or terminal operation, thereby reducing the amount of additional processing. Further, an appropriate DAI value can be determined by the DAI field changing an interpretation of a predetermined bit sequence ("00" in the above example) depending on the presence/absence of DCI assigning a feedback-enabled PDSCH and/or the presence/absence of DCI with a DAI bit sequence other than a DAI bit sequence corresponding to DAI=0.

Further, DCI assigning a PDSCH of a feedback-disabled HARQ process and DCI assigning a PDSCH of a feedback-enabled HARQ process have the same DCI size regardless of an indication content of the DAI field (e.g., difference in a DAI value), so that an increase in the number of times of blind decoding in terminal 200 can be suppressed.

<DAI Indication Method 2 in Embodiment 1>

In DAI indication method 2 according to the present embodiment, as an exemplary predetermined bit sequence, a bit sequence "11" is set in a DAI field, and the bit sequence "11" is used for indicating that the DAI value is 0. In other words, in DAI indication method 2, a predetermined bit sequence associated with DAI value=0 is "11." DAI Indication method 2 is the same as DAI indication method 1 except that, instead of the DAI bit sequence "00," "11" is used for the predetermined bit sequence.

DAI indication method 2 enhances tolerance to inconsistency of the number of HARQ-ACKs resulting from continuous PDCCH reception errors.

FIG. 12 illustrates Example 3 of interpretation of DCI and a DAI bit sequence of DCI for each slot. FIG. 13 illustrates Example 4 of interpretation of DCI and a DAI bit sequence of DCI for each slot. Note that in the tables illustrated in FIGS. 12 and 13, description of the same items as those in FIG. 10 is omitted.

Note that, for "DAI value" in FIGS. 12 and 13, a value intended by base station 100 ("gNB intention value") and a value interpreted by terminal 200, "UE interpretation value", are separately illustrated. Note that, when terminal 200 fails to receive DCI, no DAI value is obtained.

FIG. 12 illustrates case 1 for a bit sequence of a DAI field of DCI received in each of slot #0 to slot #5. FIG. 13 illustrates case 2 for a bit sequence of a DAI field of DCI received in each of slot #0 to slot #5.

Note that case 1 corresponds to a case where a DAI bit sequence "00" is used to indicate DAI value=0, and case 2 corresponds to a case where a DAI bit sequence "11" is used to indicate DAI value=0. In other words, case 1 corresponds to a case where the predetermined bit sequence is "00," and case 2 corresponds to a case where the predetermined bit sequence is "11."

In case 1 illustrated in FIG. 12, terminal 200 fails to receive DCI (e.g., PDCCH including DCI) assigning a feedback-enabled PDSCH in slot #0, and succeeds in receiving DCI (e.g., PDCCH including DCI) assigning a feedback-disabled PDSCH in slot #1. Further, terminal 200 continuously fails to receive DCI assigning a feedback-enabled PDSCH in three slots of slot #2 to slot #4. Then, terminal 200 succeeds in receiving DCI assigning a feedback-enabled PDSCH in slot #5.

As illustrated in FIG. 12, base station 100 uses a DAI bit sequence "00" in slots #0 and #1 to indicate DAI value=1. However, terminal 200 has not received DCI in slot #0, and thus terminal 200 determines that there is no feedback-enabled PDSCH assignment prior to slot #1. In other words, terminal 200 determines that at least the above-described first condition is satisfied in slot #1. In this case, terminal 200 interprets that the DAI bit sequence "00" of DCI received in slot #1 indicates DAI value=0, and interprets that the number of HARQ-ACKs is 0 based on DAI value=0.

Further, the number of HARQ-ACKs recognized by base station 100 is five in slot #5 in this case, and thus base station 100 indicates DCI including the DAI bit sequence "00" in slot #5. Meanwhile, terminal 200 interprets that the number of HARQ-ACKs based on DAI value=0 is 0 in slot #1, and fails to receive DCI in slot #2 to slot #4. Thus, terminal 200 interprets that the number of HARQ-ACKs indicated by the DAI bit sequence "00" of DCI received in slot #5 is 1. This interpretation results in an inconsistency in the number of HARQ-ACKs between base station 100 and terminal 200.

In case 2 illustrated in FIG. 13, terminal 200 continuously fails to receive DCI assigning a feedback-enabled PDSCH in four slots of slot #0 to slot #3. Then, terminal 200 succeeds in receiving DCI assigning a feedback-disabled PDSCH in slot #4 and succeeds in receiving DCI assigning a feedback-enabled PDSCH in slot #5.

As illustrated in FIG. 13, base station 100 indicates DAI bit sequences corresponding to DAI values (e.g., DAI value=1, 2, 3, and 4) indicating that the numbers of HARQ-ACKs are 1, 2, 3, and 4 in four slots of slots #0 to #3, respectively. Then, in slot #4, base station 100 uses a DAI bit sequence "11" for indicating DAI value=4 indicating that the number of HARQ-ACKs is four. However, terminal 200 has not received DCI in slot #4, and thus terminal 200 determines that there is no feedback-enabled PDSCH assignment prior to slot #4. In other words, terminal 200 determines that at least the above-described first condition is satisfied in slot #4. In this case, terminal 200 interprets that the DAI bit sequence "11" of DCI received in slot #4 indicates DAI value=0, and interprets that the number of HARQ-ACKs is 0.

Further, in this case, the number of HARQ-ACKs recognized by base station 100 is five in slot #5, and thus base station 100 indicates DCI including the DAI bit sequence "00" in slot #5. Meanwhile, terminal 200 interprets that the number of HARQ-ACKs based on DAI value=0 is 0 in slot #4. Thus, terminal 200 interprets that the number of HARQ-ACKs indicated by the DAI bit sequence "00" of DCI received in slot #5 is 1. This interpretation results in an inconsistency in the number of HARQ-ACKs between base station 100 and terminal 200.

In case 2 illustrated in FIG. 13, an inconsistency occurs between base station 100 and terminal 200 when terminal 200 receives DCI that assigns a feedback-disabled PDSCH and whose DAI bit sequence is "11" after failing to receive DCI assigning a feedback-enabled PDSCH four times consecutively, and then receives DCI that assigns a feedback-enabled PDSCH and whose DAI bit sequence is "00."

As described above, indicating DAI value=0 using a DAI bit sequence "11" relaxes the condition of the continuous reception errors causing an inconsistency and can avoid the inconsistency resulting from the reception errors.

According to above-described indication method 2 of Embodiment 1, it is possible to indicate that a DAI value is 0 without adding a new bit to a DAI field and without increasing overhead of control information. Further, it is possible to configure a HARQ-ACK codebook and/or specify the number of bits by the same method as the method (e.g., mathematical expression) defined in NR Rel.15/16 described in NPL 2. Further, by the DAI field changing an interpretation of a predetermined bit sequence ("11" in the above example) depending on the presence/absence of DCI assigning a feedback-enabled PDSCH and/or the presence/absence of DCI with a DAI bit sequence other than a predetermined bit sequence, an appropriate DAI value can be determined from a bit sequence indicated by the DAI field.

Further, DCI assigning a PDSCH of a feedback-disabled HARQ process and DCI assigning a PDSCH of a feedback-enabled HARQ process have the same DCI size regardless of an indication content of the DAI field, so that an increase in the number of times of blind decoding in terminal 200 can be suppressed.

As described above, in Embodiment 1, base station 100 determines an indication pattern to be configured to a DAI (e.g., C-DAI field and T-DAI field) indicating the number of data assignments in a HARQ process based on a configuration regarding feedback (e.g., either enabled or disabled) for the HARQ process. Further, terminal 200 receives the indication pattern configured based on the configuration regarding the feedback for the HARQ process in the DAI indicating the number of data assignments in the HARQ process, and controls data reception based on the received indication pattern. Then, at least one of a plurality of patterns associated with the first candidate value for a value (e.g., DAI value) related to the number of data assignments in a feedback-enabled HARQ process is associated with the second candidate value (e.g., DAI value=0) not included in the first candidate value. When indicating that a value related to the number of data assignments in a feedback-disabled HARQ process is the second candidate value, base station 100 determines that any one of the at least one of the patterns is the indication pattern. When the indication pattern indicates any one of the at least one of the patterns, terminal 200 determines the value related to the number of data assignments indicated by the indication pattern, based on DCI related to the feedback-enabled HARQ process.

For example, terminal 200 can increase the probability of identifying (probability of success in identifying) a HARQ-ACK codebook size in a feedback-enabled HARQ process by receiving a DAI value of a feedback-enabled HARQ process in a DAI field in DCI assigning data of a feedback-disabled HARQ process. Further, by the DAI field changing an interpretation of a predetermined bit sequence depending on the presence/absence of DCI assigning a feedback-enabled PDSCH and/or the presence/absence of DCI with a bit sequence other than a predetermined bit sequence, an appropriate DAI value can be determined from a bit sequence indicated by the DAI field, and thus efficiency of retransmission control by HARQ can be enhanced.

Therefore, according to Embodiment 1, it is possible to enhance the efficiency of HARQ processing by using a DAI (e.g., C-DAI and T-DAI) corresponding to a feedback-disabled HARQ process.

Although indication method I using a DAI bit sequence "00" and indication method 2 using a DAI bit sequence "11" for indicating DAI value=0 have been described, the present disclosure is not limited thereto. For example, a DAI bit sequence "01" or "10" may be used for indicating DAI value=0.

Further, any bit sequence may be used for indicating DAI value=0 without specifying which DAI bit sequence to be used for indicating DAI value=0. For example, terminal 200 may interpret any DAI bit sequence as DAI value=0 when a predetermined condition is satisfied. For example, terminal 200 interprets a DAI value of DCI assigning a feedback-disabled PDSCH as the following.

When

A condition that there is no PDSCH assignment of a feedback-enabled HARQ process for the same HARQ-ACK timing, and A condition that DCI that assigns a PDSCH for the same HARQ-ACK timing and whose DAI value is not interpreted as 0 is not received are satisfied, terminal 200 interprets that DAI value=0 regardless of the DAI bit sequence of the DAI field. Note that terminal 200 may interpret that DAI value=0 when either one of these two conditions is satisfied, or may use either one of them as a condition for interpretation of the DAI value and need not use the other as a condition for interpretation of the DAI value.

Further, a bit sequence associated with DAI value=0 may be two or more. The bit sequence to be used for indicating DAI value=0 may be referred to as a “particular bit sequence x.” In other words, the particular bit sequence x used for indicating DAI value=0) is associated with DAI value=0. In this case, terminal 200 may interpret the particular bit sequence x as DAI value=0 according to a predetermined condition.

The particular bit sequence x may be fixed or may be dynamically or statically changed. For example, information on the particular bit sequence x may be indicated from base station 100 to terminal 200 in advance.

For example, terminal 200 interprets a DAI value of DCI assigning a feedback-disabled PDSCH as the following.

When

A condition that there is no assignment of a PDSCH of a feedback-enabled HARQ process for the same HARQ-ACK timing (hereinafter, referred to as the “fifth condition”), and A condition that DCI that assigns a PDSCH for the same HARQ-ACK timing and whose DAI bit sequence is other than the particular bit sequence x is not received (hereinafter, referred to as the “sixth” condition”)

are satisfied, terminal 200 interprets the particular bit sequence x of the DAI field as DAI value=0.

And, when

A condition that there is an assignment of a PDSCH of a feedback-enabled HARQ process for the same HARQ-ACK timing (hereinafter, referred to as the “seventh condition”), or A condition that DCI that assigns a PDSCH for the same HARQ-ACK timing and whose DAI bit sequence is other than the particular bit sequence x is received (hereinafter, referred to as the “eighth condition”)

is satisfied, the particular bit sequence x in the DAI field is interpreted as a specified value (e.g., see FIG. 8) of NR Rel. 15/16 described in NPL 2.

Note that the fifth condition to the eighth condition described above are the same as the first condition to the fourth condition, respectively, except that the bit sequence associated with DAI value=0 is different.

Further, the DAI value may be interpreted as 0 when either one of the first and second conditions is satisfied, or either one of the first and second conditions may be used as a condition for interpretation of the DAI value, and the other need not be used as a condition for interpretation of the DAI value. Similarly, the DAI value may be interpreted as a specified value of NR Rel. 15/16 described in NPL 2 when either one of the third and fourth conditions is satisfied, or either one of the third and fourth conditions may be used for a condition for interpretation of the DAI value, and the other need not be used as a condition for interpretation of the DAI value.

Embodiment 2

In Embodiment 2, the base station (transmission side) indicates each of C-DAI and T-DAI that include no PDSCH assignment of a feedback-disabled HARQ process.

The terminal determines a HARQ-ACK codebook size based on the C-DAI and T-DAI. In DCI assigning a PDSCH of a feedback-disabled HARQ process, a predetermined DAI (C-DAI, T-DAI) is indicated when there is no PDSCH assignment of a feedback-enabled HARQ process for the same HARQ-ACK timing. When receiving DCI with the predetermined DAI and receiving no DCI with a DAI other than the predetermined DAI, the terminal interprets that the number of HARQ-ACKs is 0. In this interpretation, HARQ-ACK codebook generation processing need not be performed, and no HARQ-ACK codebook may be transmitted.

The configurations of the base station and the terminal are the same as those of Embodiment 1. Thus, in the following description, the base station and the terminal are sometimes referred to as base station 100 and terminal 200 as in Embodiment 1. Embodiment 2 is different from Embodiment 1 in the DAI indication method of DCI assigning a feedback-disabled PDSCH.

<DAI Indication Method in Embodiment 2>

FIG. 14 illustrates an exemplary method for indicating a DAI value in Embodiment 2. In the table 9.1.3-1 of NPL 2, a range of values of Y representing the number of PDSCH assignments (that is, the number of HARQ-ACKs) is defined as one or more. In FIG. 14, as indicated by Y≥0, the range of values of Y representing the number of PDSCH assignments (that is, the number of HARQ-ACKs) includes 0. Note that, in FIG. 14, $T_D$ is a value defined by, for example, the number of bits of the DAI field. When the number of bits of the DAI field is 2, then $T_D=2^2=4$.

For example, in FIG. 14, when Y=0, $(Y-1) \bmod T_D+1=(0-1) \bmod 4+1=4$. Thus, base station 100 indicates a DAI bit sequence “11” when the number of PDSCHs for performing HARQ-ACK feedback is 0 (that is, Y=0). In this case, a DAI bit sequence associated with Y=0 is “11.” In Embodiment 2, the DAI bit sequence associated with Y=0 may be referred to as a “predetermined bit sequence.” Note that the DAI bit sequence associated with Y=0 may also be referred to as a “DAI bit sequence determined based on Y=0.”

For example, in the case of FIG. 14, a bit sequence “00” is associated with Y=1, 5, 9, . . . , a bit sequence “01” is associated with Y=2, 6, 10, . . . , a bit sequence “10” is associated with Y=3, 7, 11, . . . , and a bit sequence “11” is associated with Y=4, 8, 12, . . . . For example, Y≥1 is a candidate for a value of Y indicated by DCI assigning a PDSCH of a feedback-enabled HARQ process. Then, in DAI indication method 2, a bit sequence “11” is associated with Y=0 as illustrated in FIG. 14. Y=0 is a value not included in the candidate for the value of Y indicated by DCI assigning the PDSCH of the feedback-enabled HARQ process.

Note that when the number of bits of the DAI field is 1, since $T_D=2^1=2$, $(Y-1) \bmod T_D+1=(0-1) \bmod 2+1=2$. Thus, when the number of assignments of PDSCHs for performing HARQ-ACK feedback is 0 and the number of bits of the DAI field is 1, base station 100 indicates a DAI bit sequence "1." In this case, a DAI bit sequence associated with Y=0 is "1."

Terminal 200 interprets the information indicated by the indicated predetermined bit sequence based on a predetermined condition.

When

A condition that there is no assignment of a PDSCH of a feedback-enabled HARQ process for the same HARQ-ACK timing (hereinafter, referred to as the "ninth condition"), and A condition that DCI that assigns a PDSCH for the same HARQ-ACK timing and whose DAI bit sequence is other than the DAI bit sequence associated with Y=0 (that is, the predetermined bit sequence) is not received (hereinafter, referred to as the "tenth condition")

are satisfied, the predetermined bit sequence (e.g., DAI bit sequence "11") is interpreted as Y=0.

When the predetermined bit sequence (e.g., DAI bit sequence "11") is interpreted as Y=0, terminal 200 need not perform HARQ-ACK codebook generation described in section 9.1.3 of NPL 2 and may transmit no HARQ-ACK codebook.

Then, when

A condition that there is an assignment of a PDSCH of a feedback-enabled HARQ process for the same HARQ-ACK timing (hereinafter, referred to as the "eleventh condition"), or A condition that DCI that assigns a PDSCH for the same HARQ-ACK timing and whose DAI bit sequence is other than the DAI bit sequence associated with Y=0 (that is, the predetermined bit sequence) is received (hereinafter, referred to as the "twelfth condition")

is satisfied, terminal 200 interprets the predetermined bit sequence (e.g., DAI bit sequence "11") as a specified value of a DAI value in NR Rel. 15/16 (e.g., a specified value of Table 9.1.3-1 of NPL 2).

In this case, terminal 200 may perform HARQ-ACK codebook generation processing described in section 9.1.3 of NPL 2 and may transmit a HARQ-ACK codebook.

Note that the ninth condition to the twelfth condition described above are the same as the first condition to the fourth condition, respectively, except for the difference in that a DAI bit sequence to be the determination target is a bit sequence associated with DAI value=0 or a bit sequence associated with Y=0.

According to the above-described indication method of Embodiment 2, it is possible to indicate Y=0 without adding a new bit in a DAI field and without increasing overhead of control information. Further, it is possible to configure a HARQ-ACK codebook and/or specify the number of bits by the same method as the method (e.g., mathematical expression) defined in NR Rel.15/16. Further, by the DAI field changing an interpretation of a predetermined bit sequence (in the above-described example, DAI bit sequence "11" associated with Y=0) depending on the presence/absence of DCI assigning a feedback-enabled PDSCH and/or the presence/absence of DCI with a DAI bit sequence other than a DAI bit sequence associated with Y=0, an appropriate value for Y can be determined.

Further, DCI assigning a PDSCH of a feedback-disabled HARQ process and DCI assigning a PDSCH of a feedback-enabled HARQ process have the same DCI size regardless of an indication content of the DAI field, and therefore, an increase in the number of times of blind decoding in terminal 200 can be suppressed.

As described above, in Embodiment 2, base station 100 determines an indication pattern to be configured to a DAI (e.g., C-DAI field and T-DAI field) indicating the number of data assignments in a HARQ process based on a configuration regarding feedback (e.g., either enabled or disabled) for the HARQ process. Further, terminal 200 receives the indication pattern configured based on the configuration regarding the feedback for the HARQ process in the DAI indicating the number of data assignments in the HARQ process, and controls data reception based on the received indication pattern. Then, at least one of a plurality of patterns associated with the first candidate value for a value (e.g., "Y") related to the number of data assignments in a feedback-enabled HARQ process is associated with the second candidate value (e.g., Y=0) not included in the first candidate value. When indicating that a value related to the number of data assignments in a feedback-disabled HARQ process is the second candidate value, base station 100 determines that any of the at least one of the patterns is the indication pattern. When the indication pattern indicates any of the at least one of the patterns, terminal 200 determines the value related to the number of data assignments indicated by the indication pattern, based on DCI related to the feedback-enabled HARQ process.

For example, terminal 200 can increase the probability of identifying (probability of success in identifying) a HARQ-ACK codebook size in a feedback-enabled HARQ process by receiving a DAI value of a feedback-enabled HARQ process in a DAI field in DCI assigning data of a feedback-disabled HARQ process. Further, by the DAI field changing an interpretation of a predetermined bit sequence depending on the presence/absence of DCI assigning a feedback-enabled PDSCH and/or the presence/absence of DCI with a bit sequence other than the predetermined bit sequence, an appropriate DAI value can be determined from a bit sequence indicated by the DAI field, and thus efficiency of retransmission control by HARQ can be enhanced.

Therefore, according to Embodiment 2, it is possible to enhance the efficiency of HARQ processing by using a DAI (e.g., C-DAI and T-DAI) corresponding to a feedback-disabled HARQ process.

Note that, although FIG. 14 illustrates an example that is based on Table 9.1.3-1 of NPL 2, the present disclosure is not limited thereto. For example, an association different from that in FIG. 14 may be defined for a range of Y≥0 and a DAI value and/or DAI bit sequence.

Further, when Y=0, a DAI value and/or DAI bit sequence may be determined by a definition different from that for the case of Y≥1. Furthermore, any bit sequence may be used for indicating Y=0 without specifying which DAI bit sequence to be used for indicating Y=0. For example, terminal 200 may interpret any DAI bit sequence as Y=0 when a predetermined condition is satisfied. For example, when A condition that there is no PDSCH assignment of a feedback-enabled HARQ-process for the same HARQ-ACK timing, or A condition that DCI that assigns a PDSCH for the same HARQ-ACK timing and whose DAI bit sequence is associated with other than Y=0 is not received is satisfied, terminal 200 interprets that Y=0 regardless of the DAI bit sequence of DCI assigning a feedback-disabled PDSCH. Note that terminal 200 may interpret that Y=0 when either one of these two condition is satisfied, or may use either one of them as a condition for interpretation of the Y value and need not use the other as a condition for interpretation of the Y value.

Further, the bit sequence associated with Y=0 may be two or more. The bit sequence used for indicating Y=0 may be referred to as a "particular bit sequence x." In other words, the particular bit sequence x used for indicating DAI value=0 is associated with Y=0. In this case, terminal 200 may interpret the particular bit sequence x as Y=0 according to a predetermined condition. For example, the predetermined condition may be the same as the fifth to eighth conditions described in Embodiment 1.

Further, terminal 200 may interpret that Y=0 when either one of the ninth and tenth conditions is satisfied, or may use either one of them as a condition for interpretation of Y and need not use the other as a condition for interpretation of Y. Similarly, terminal 200 may interpret the bit sequence as a specified value of NR Rel. 15/16 described in NPL 2 when either one of the eleventh and twelfth conditions is satisfied, or may use either one of them as a condition for interpretation of Y and need not use the other as a condition for interpretation of Y.

Embodiment 3

In Embodiment 3, the base station (transmission side) indicates each of a C-DAI and T-DAI that include no PDSCH assignment of a feedback-disabled HARQ process.

The terminal determines a HARQ-ACK codebook size based on the C-DAI and T-DAI. In DCI assigning a PDSCH of a feedback-disabled HARQ process, a particular or any DAI (C-DAI, T-DAI) is indicated when there is no PDSCH assignment of a feedback-enabled HARQ process for the same HARQ-ACK timing. When receiving only DCI assigning a PDSCH of a feedback-disabled HARQ process, the terminal need not perform HARQ-ACK codebook generation processing and may transmit no HARQ-ACK codebook.

The configurations of the base station and the terminal are the same as those of Embodiment 1.

In Embodiment 3, the operations of terminal 200 and the network (e.g., base station 100) are specified so that the terminal does not delete DCI assigning a PDSCH of a feedback-disabled HARQ process when there is no PDSCH assignment of a feedback-enabled HARQ process for the same HARQ-ACK timing.

Operation Specification Method 1

When receiving DCI, the terminal of NR Rel.15/16 possibly determines that the terminal erroneously receives DCI based on the relation with the DAI value of DCI previously received or the like, and deletes the received DCI. Further, when receiving DCI, the terminal of NR Rel. 15/16 may erroneously recognize that there is an error in reception of DCI based on the relation with the DAI value of DCI previously received or the like.

In an NTN, the terminal may also operate in the same manner as NR Rel. 15/16.

For example, when receiving DCI assigning a feedback-disabled PDSCH before receiving DCI assigning a feedback-enabled PDSCH for the same HARQ-ACK timing, the terminal possibly deletes the DCI assigning the feedback-disabled PDSCH based on an inconsistency of DAI values.

For example, when, DAI value=4 is indicated in the first DCI among a plurality of pieces of DCI assigning feedback-enabled PDSCHs of the same HARQ-ACK timing as a certain HARQ-ACK timing, the terminal possibly determines that the terminal erroneously detects the DCI. Alternatively, when DAI=4 is indicated in the first DCI among a plurality of pieces of DCI assigning feedback-enabled PDSCHs of the same HARQ-ACK timing as a certain HARQ-ACK timing, the terminal may erroneously determine that there is an error in reception of three pieces of DCI (e.g., DCI of DAI values=1, 2, and 3).

Thus, in Operation specification method 1 of Embodiment 3, the operation of the terminal and/or the network (e.g., base station) is explicitly specified as any of the following.

- The terminal possibly receives DCI that indicates any DAI value (or any DAI bit sequence) and assigns a feedback-disabled PDSCH when there is no assignment of a feedback-enabled PDSCH for the same HARQ-ACK timing
- The network (e.g., base station) possibly transmits DCI that indicates any DAI value (or any DAI bit sequence) and assigns a feedback-disabled PDSCH when there is no assignment of a feedback-enabled PDSCH for the same HARQ-ACK timing
- The terminal possibly receives DCI that indicates a particular DAI value (or particular DAI bit sequence) and assigns a feedback-disabled PDSCH when there is no assignment of a feedback-enabled PDSCH for the same HARQ-ACK timing
- The network (e.g., base station) possibly transmits DCI that indicates a particular DAI value (or particular DAI bit sequence) and assigns a feedback-disabled PDSCH when there is no assignment of a feedback-enabled PDSCH for the same HARQ-ACK timing Then, the terminal may receive DCI assigning a feedback-disabled PDSCH even when there is no feedback-enabled PDSCH assignment for the same HARQ-ACK timing. In this case, the terminal may perform decoding of PDSCH without deleting the DCI. Further, in this case, the terminal may ignore a DAI value indicated by the DCI assigning the feedback-disabled PDSCH.

According to the above-described Operation specification method 1, the terminal can avoid erroneous deletion of DCI assigning a feedback-disabled PDSCH.

Operation Specification Method 2

Operation specification method 2 specifies that no DCI assigning a feedback-disabled PDSCH is transmitted when there is no assignment of a feedback-enabled PDSCH for the same HARQ-ACK timing. For example, for the operation of the terminal and/or the network (e.g., base station), any of the following operations is specified.

- The terminal need not receive DCI that indicates any DAI value (or any DAI bit sequence) and assigns a feedback-disabled PDSCH when there is no assignment of a feedback-enabled PDSCH for the same HARQ-ACK timing
- The network (e.g., base station) transmits no DCI that indicates any DAI value (or any DAI bit sequence) and assigns a feedback-disabled PDSCH when there is no assignment of a feedback-enabled PDSCH for the same HARQ-ACK timing
- The terminal need not receive DCI that indicates a particular DAI value (or particular DAI bit sequence) and assigns a feedback-disabled PDSCH when there is no assignment of a feedback-enabled PDSCH for the same HARQ-ACK timing
- The network (e.g., base station) transmits no DCI that indicates a particular DAI value (or particular DAI bit sequence) and assigns a feedback-disabled PDSCH when there is no assignment of a feedback-enabled PDSCH for the same HARQ-ACK timing In this case, when the terminal performs determination of misdetection and/or a reception error in NR Rel. 15/16, the terminal can reuse the implementation of NR Rel. 15/16.

Note that, in a DAI of DCI assigning a feedback-disabled PDSCH, since the number of assignments of slots and/or CCs of a feedback-disabled PDSCH is not included in a count value, the same value as a DAI of DCI assigning a feedback-enabled PDSCH may be indicated by the DCI assigning the feedback-disabled PDSCH. Thus, as long as the same DAI value is indicated by the DCI assigning the feedback-enabled PDSCH, the DAI value of the DCI assigning the feedback-disabled PDSCH may be ignored. In this case, HARQ-ACK codebook generation processing may be performed using the DAI value of the DCI assigning the feedback-enabled PDSCH. Further, when the same DAI value is not indicated by the DCI assigning the feedback-enabled PDSCH, HARQ-ACK codebook generation processing may be performed using a DAI value of the DCI assigning the feedback-disabled PDSCH.

Note that, in the above-described embodiments, description has been given of an example where the number of bits of the DAI field is two, but the number of bits is not limited thereto. For example, the present disclosure may be applied to a case where the number of bits of the DAI field is one. When the number of bits of the DAI field is one, table 9.1.3-1A of NPL 2 may be used, for example.

The terminal may ignore or delete a DAI value indicated by DCI assigning a feedback-disabled PDSCH when the terminal receive no DCI assigning a feedback-enabled PDSCH for the same HARQ-ACK timing. Further, the terminal may transmit no HARQ-ACK when the terminal receive no DCI assigning a feedback-enabled PDSCH for a certain HARQ-ACK timing. The operation of ignoring or deleting the DAI value and/or the operation of transmitting no HARQ-ACK can simplify the terminal operation.

For example, in the above-described embodiments, a HARQ-ACK is transmitted in a PUCCH, but the present disclosure is not limited thereto. For example, the present disclosure may be applied to a case where a HARQ-ACK is transmitted in a PUSCH. When a HARQ-ACK is transmitted in a PUSCH, the terminal may generate a HARQ-ACK codebook based on a DAI value indicated by DCI assigning a PUSCH.

When a HARQ-ACK is transmitted in a PUSCH and there is no assignment of a feedback-enabled PDSCH, the terminal may indicate DAI value=0 by a predetermined DAI bit sequence associated with DAI value=0, as in Embodiment 1. Alternatively, when a HARQ-ACK is transmitted in a PUSCH and there is no assignment of a feedback-enabled PDSCH, the terminal may indicate the number of HARQ-ACKs=0 (e.g., Y=0) by a predetermined bit sequence associated with Y=0, as in Embodiment 2.

Further, it may be configured that no HARQ-ACK codebook is transmitted in a PUSCH when a certain condition is satisfied regardless of the DAI value indicated by DCI assigning a PUSCH. For example, the certain condition may be a condition that DCI assigning a feedback-enabled PDSCH is not received (hereinafter, referred to as the "thirteenth condition"). Alternatively, the certain condition may be a condition that DCI with a DAI bit sequence other than a predetermined DAI bit sequence associated with DAI value=0 is not received in Embodiment 1 (hereinafter, referred to as the "fourteenth condition"), or a condition that DCI with a DAI bit sequence other than a DAI bit sequence associated with Y=0 is not received in Embodiment 2 (hereinafter, referred to as the "fifteenth condition"). For example, both the thirteenth and fourteenth conditions may be used, or both the thirteenth and fifteenth conditions may be used.

Note that, in the above-described embodiments, description has been given of an example of assigning a feedback-enabled PDSCH for the same HARQ-ACK timing, but the present disclosure is not limited thereto. For example, the same HARQ-ACK timing may be the same HARQ-ACK transmission slot. Further, the same HARQ-ACK timing may be the same HARQ-ACK resource including time and frequency resources.

Further, in the above-described embodiments, the phrase "not receive DCI assigning a feedback-enabled PDSCH" may be read as "not receive a feedback-enabled PDSCH."

Furthermore, the phrase "a feedback-enabled PDSCH" may be read as "a PDSCH of a feedback-enabled HARQ process." Moreover, the phrase "a feedback-disabled PDSCH" may be read as "a PDSCH of a feedback-disabled HARQ process."

The phrase "DCI assigning a feedback-enabled PDSCH" may be read to as "DCI assigning a PDSCH in which feedback is enabled", "DCI with HARQ feedback," or "DCI with feedback-enabled HARQ process."

In addition, "DCI assigning a feedback-enabled PDSCH" may be read as "DCI assigning a PDSCH in which feedback is disabled", "DCI without HARQ feedback," or "DCI with feedback disabled HARQ process."

Embodiments of the present disclosure have been each described, thus far.

Note that, although transmission of downlink data (e.g., PDSCH) from base station 100 to terminal 200 has been described in the above embodiments, an embodiment of the present disclosure is not limited thereto and may be applied to uplink data (e.g., PUSCH) from terminal 200 to base station 100 or data in a link (e.g., sidelink) between terminals 200. Further, although retransmission of data (e.g., PDSCH) has been described in the above embodiments, a retransmission target is not limited to data (or data channel) and may be another signal or channel.

HARQ-ACK bits included in a HARQ-ACK codebook are not limited to HARQ-ACK bits for PDSCH reception and may be HARQ-ACK bits for other signals. For example, a HARQ-ACK codebook may include HARQ-ACK bits for DCI indicating semi-persistent scheduling (SPS) release (or also referred to as SPS PDSCH release) or Scell dormancy. In addition, a C-DAI value and a T-DAI value including the HARQ-ACK bits may be indicated in both a C-DAI field and a T-DAI field.

In the above-described embodiments, a description has been given of a case where both the C-DAI field and T-DAI field are indicated to terminal 200, but the present disclosure is not limited thereto, and one of the C-DAI field and T-DAI field may be indicated to terminal 200 and the other may not be indicated to terminal 200. For example, when terminal 200 is configured with a single CC (or single cell), information of the C-DAI field may be indicated to terminal 200 and information of the T-DAI field may not be indicated to terminal 200. In this case, for example, the C-DAI field in DCI assigning a feedback-disabled HARQ process may include a C-DAI value in which data assignment in the feedback-disabled HARQ process is not counted, as in the above-described configuration method of DAI.

Further, the above-described configuration methods of DAI may be combined according to a base station or cell parameter configuration. The configuration method of DAI may be different between a case where a single CC (or single cell) is configured and a case where a plurality of CCs (or a plurality of cells) are configured. In this case, when a single CC (or single cell) is configured, a C-DAI value may be indicated to terminal 200 in a C-DAI field in DCI assigning a feedback-disabled HARQ process, and information of a T-DAI field need not be indicated. Meanwhile, when a plurality of CCs (or a plurality of cells) is configured, the C-DAI field in DCI assigning the feedback-disabled HARQ process may be reserved.

"Type 3 HARQ-ACK codebook" in which terminal 200 collectively transmits the past HARQ-ACKs is specified considering, for example, a possibility that terminal 200 does not transmit HARQ-ACK during the operation in an unlicensed band (also referred to as NR-Unlicensed (NR-U), for example). For example, an embodiment of the present disclosure may be applied when the Type3 HARQ-ACK codebook is used. An embodiment of the present disclosure may also be applied when another HARQ-ACK codebook is used in addition to the Type3 HARQ-ACK codebook, for example, when information on the HARQ-ACK codebook size is indicated by DAI.

Although, in the above-described embodiments, a description has been given of a case of using a DAI field, which is a field for indicating a parameter on the number of data assignments, a field used for indicating information to terminal 200 is not limited thereto in an embodiment of the present disclosure. For example, the field used for indicating information to terminal 200 in an embodiment of the present disclosure may be another field related to HARQ or HARQ-ACK feedback such as a HARQ process ID, NDI, RV, PDSCH-to-HARQ_feedback timing indicator. Also, for example, the field used for indicating information to terminal 200 in an embodiment of the present disclosure may be specified as a reserved field in a certain release (e.g., Release 17), and may be used for a purpose other than indication of the information on the number of data assignments in the subsequent releases.

NR Rel. 15/16 specifies DCI formats 1_0, 1_1, and 1_2 as a DCI format used for downlink scheduling (data assignment), and an embodiment of the present disclosure may be applied to all of these DCI formats or at least one of them. In addition, indication information in a DAI field may be changed individually for each DCI format.

Further, although a description has been given of an example where HARQ feedback is enabled or disabled individually for the HARQ processes, HARQ feedback may be enabled or disabled individually for the terminals or individually for the cells.

An embodiment of the present disclosure is also applicable to any type of satellite such as a GEO, medium earth orbit satellite (MEO), LEO, or highly elliptical orbit satellite (HEO). Further, an embodiment of the present disclosure may be applied to non-terrestrial communication such as communication performed by a HAPS or a drone base station.

Further, the above embodiments have been described by taking the NTN environment (e.g., satellite communication environment) as an example, but the present disclosure is not limited thereto. The present disclosure may be applied to other communication environments (e.g., at least one terrestrial cellular environment in LTE and NR). For example, an embodiment of the present disclosure may be applied to terrestrial communication in an environment where the cell size is large and the propagation delay between base station 100 and terminal 200 is longer (e.g., equal to or longer than a threshold), for example. In addition, an embodiment of the present disclosure may be applied not only to the NTN but also to communication to which HARQ or feedback-disabled HARQ is applied.

Further, in the above-described embodiment, the satellite communication may have a configuration in which the base station functionality is on the satellite (e.g., "regenerative satellite"), or a configuration in which the base station functionality is on the ground and the satellite relays the communication between the base station and a terminal (e.g., "transparent satellite"). In other words, in an embodiment of the present disclosure, for example, the downlink and uplink may be a link between a terminal and the satellite or a link via the satellite.

The parameters in the above-described embodiments are examples and may include other values. For example, the numbers of slots and CCs to which the number of data assignments is indicated by DAI are not limited to two slots and four CCs, and may include other numbers of slots and CCs.

HARQ-ACK may be referred to as ACK/NACK or HARQ-feedback, for example.

The base station may be referred to as a gNodeB or a gNB. Further, the terminal may be referred to as UE.

A Slot may be replaced with a time slot, a mini-slot, a frame, a subframe, or the like.

Further, any component with a suffix, such as "-er," "-or," or "-ar" in each of the above-described embodiments may be replaced with another term such as "circuit (circuitry)," "device," "unit," or "module."

Supplement

Information indicating whether terminal 200 supports the functions, operations, or processing described in each of the above embodiments and variations may be transmitted (or indicated) from terminal 200 to base station 100 as, for example, capability information or a capability parameter of terminal 200.

The capability information may include information elements (IEs) individually indicating whether terminal 200 supports at least one of the functions, operations, and processing described in each of the above embodiments and variations. Alternatively, the capability information may include an information element indicating whether terminal 200 supports a combination of any two or more of the functions, operations, and processing described in each of the above embodiments and variations.

Base station 100, for example, may determine (decide or assume), based on the capability information received from terminal 200, the functions, operations, and processing supported (or unsupported) by terminal 200 that has transmitted the capability information. Base station 100 may perform operations, processing, or control according to the determination result based on the capability information. For example, base station 100 may control at least one of downlink resource allocation, such as PDCCH or PDSCH, and uplink resource allocation, such as PUCCH or PUSCH (e.g., scheduling including configuration in a DAI field), based on the capability information received from terminal 200.

Note that the fact that terminal 200 does not support some of the functions, operations, or processing described in each of the above embodiments and variations may be interpreted as limitation of such functions, operations, or processing in terminal 200. For example, information or a request related to such limitation may be indicated to base station 100.

Information on the capability or limitation of terminal 200 may be, for example, defined in a standard, or implicitly indicated to base station 100 in association with information known in base station 100 or information transmitted to base station 100.

(Control Signal)

In the present disclosure, the downlink control signal (or information) relating to the present disclosure may be a signal (information) transmitted in a Physical Downlink Control Channel (PDCCH) of a physical layer or may be a signal (information) transmitted in a MAC CE (control element) or RRC in a higher layer. Further, the downlink control signal may be a predefined signal (information).

The uplink control signal (information) relating to the present disclosure may be, for example, a signal (information) transmitted in a PUCCH of the physical layer or a signal (information) transmitted in the MAC CE or RRC of the higher layer. Further, the uplink control signal may be a predefined signal (information). Further the uplink control signal may be replaced with, for example, uplink control information (UCI), 1st stage sidelink control information (SCI), or 2nd stage SCI.

(Base Station)

In the present disclosure, the base station may be a Transmission Reception Point (TRP), a cluster head, an access point, a Remote Radio Head (RRH), an eNodeB (eNB), a gNodeB (gNB), a Base Station (BS), a Base Transceiver Station (BTS), a master device, a gateway, or the like. Further, in the sidelink communication, a terminal may play a role of the base station. Alternatively, the base station may be a relay device that relays communication between a higher node and a terminal, or may be a roadside device.

(Uplink/Downlink/Sidelink)

The present disclosure may be applied to, for example, any of an uplink, a downlink, and a sidelink. For example, the present disclosure may be applied to a PUSCH, a PUCCH, and a PRACH in the uplink, a PDSCH, PDCCH or a PBCH in the downlink, or a Physical Sidelink Shared Channel (PSSCH), a Physical Sidelink Control Channel (PSCCH), a Physical Sidelink Broadcast Channel (PSBCH) in the sidelink.

Note that the PDCCH, PDSCH, PUSCH and PUCCH are one examples of a downlink control channel, a downlink data channel, an uplink data channel, and an uplink control channel, respectively. The PSCCH and PSSCH are one examples of a sidelink control channel and a sidelink data channel. Further, PBCH and PSBCH are broadcast channels, and PRACH is an exemplary random access channel.

(Data Channel/Control Channel)

One exemplary embodiment of the present disclosure may be applied to, for example, either of a data channel or a control channel. For example, a channel in the present disclosure may be replaced with the PDSCH, PUSCH, and PSSCH being the data channels or the PDCCH, PUCCH, PBCH, PSCCH, and PSBCH being the control channels.

(Reference Signal)

In the present disclosure, a reference signal is a signal known to both of a base station and a terminal, and may also be referred to as a Reference Signal (RS) or a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), or a Sounding Reference Signal (SRS).

(Time Interval)

In the present disclosure, the units of time resources are not limited to one or a combination of slots and symbols, but may be time resource units such as, for example, frames, superframes, subframes, slots, time slot subslots, minislots, or symbols, Orthogonal Frequency Division Multiplexing (OFDM) symbols, Single Carrier-Frequency Division Multiplexing (SC-FDMA) symbols, or other time resource units. The number of symbols included in one slot is not limited to the number of symbols exemplified in the above-described embodiments, and may be another number of symbols.

(Frequency Band)

The present disclosure may be applied to either a licensed band or an unlicensed band.

(Communication)

The present disclosure may be applied to any of communication between a base station and a terminal (Uu link communication), communication between a terminal and a terminal (Sidelink communication), and communication of a Vehicle to Everything (V2X). For example, the channel in the present disclosure may be replaced with the PSCCH, PSSCH, Physical Sidelink Feedback Channel (PSFCH), PSBCH, PDCCH, PUCCH, PDSCH, PUSCH, or PBCH.

In addition, the present disclosure may be applied to either of a terrestrial network or a network other than the terrestrial network using a satellite or a High Altitude Pseudo Satellite (HAPS) (Non-Terrestrial Network (NTN)). Further, the present disclosure may be applied to a terrestrial network having a larger transmission delay in comparison to a symbol length or a slot length, such as a network having a large cell size or an ultra-wideband transmission network.

(Antenna Port)

In the present disclosure, an antenna port refers to a logical antenna (antenna group) composed of one physical antennas or a plurality of physical antennas. That is, the antenna port does not necessarily refer to one physical antenna, and may refer to an array antenna including a plurality of antennas. For example, it is not defined how many physical antennas the antenna port is composed of, and the number of physical antennas is defined as the smallest unit allowing a terminal to transmit a Reference signal. Also, the antenna port may be defined as the smallest unit multiplied by a weight of a precoding vector.

<5G NR System Architecture and Protocol Stack>

3GPP has been working at the next release for the 5th generation cellular technology, simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of terminals (e.g., smartphones).

Figure 15:
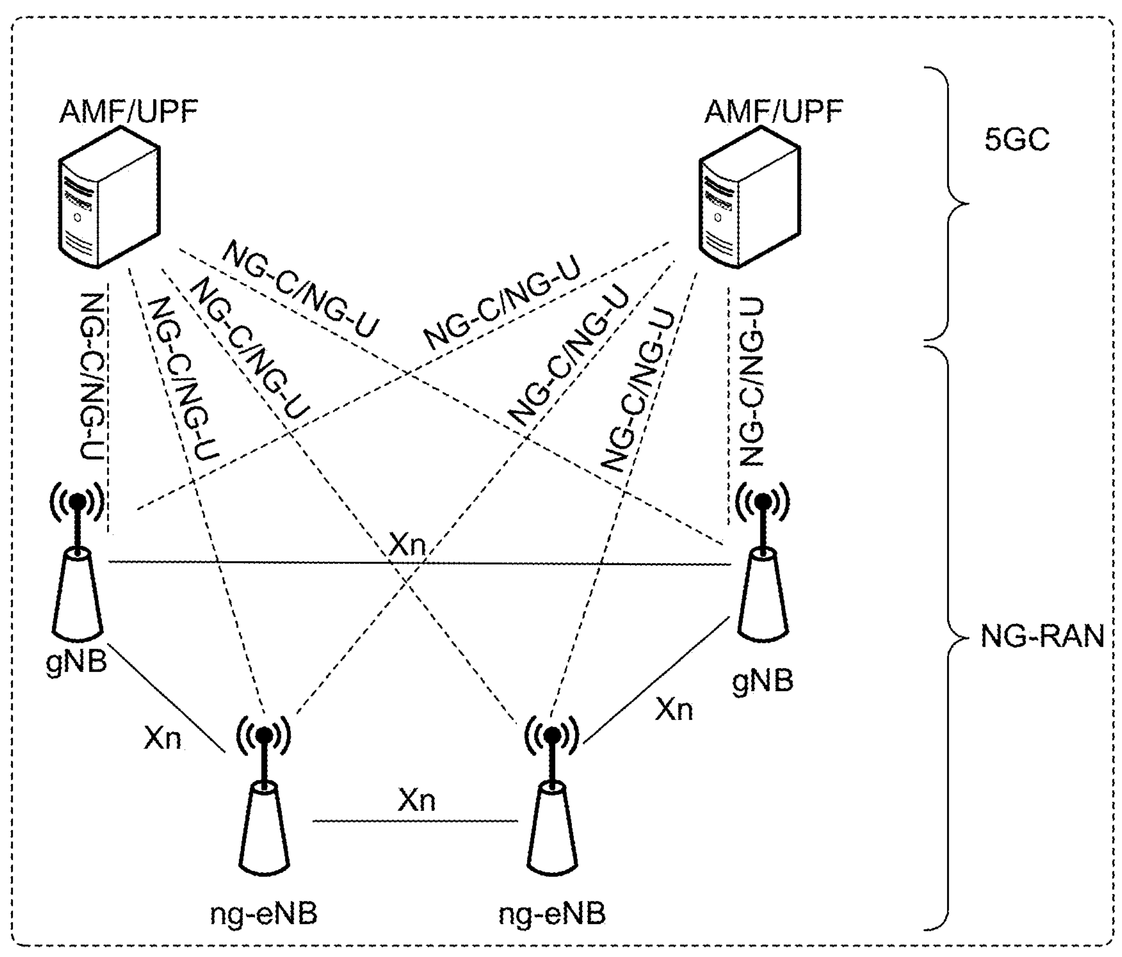
FIG. 15 illustrates an exemplary architecture for a 3GPP NR system.

For example, the overall system architecture assumes an NG-RAN (Next Generation-Radio Access Network) that includes gNBs. The gNB provides the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 15 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC, and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 KHz, 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

<Functional Split Between NG-RAN and 5GC in 5G NR>

Figure 16:
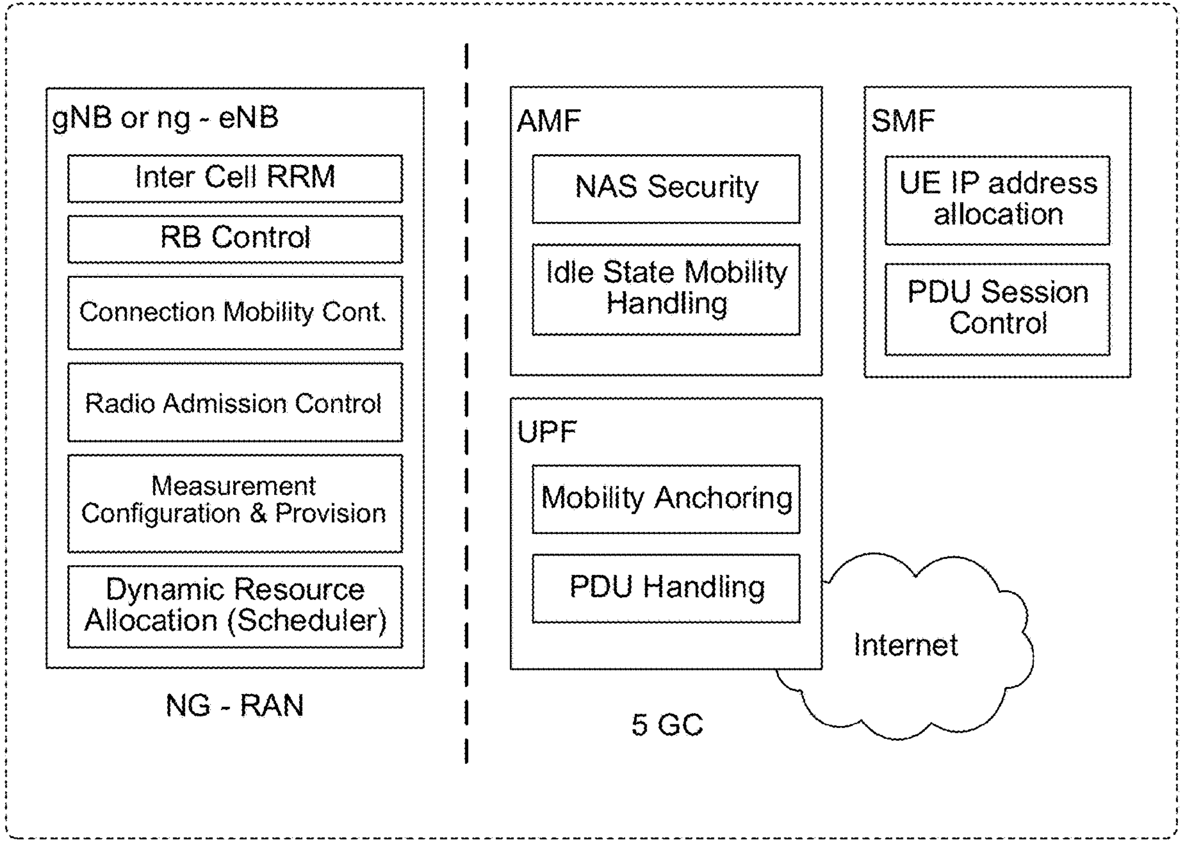
FIG. 16 is a schematic drawing that shows a functional split between NG-RAN and 5GC.

FIG. 16 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

- Radio Resource Management functions such as Radio Bearer Control, Radio Admission Control, Connection Mobility Control, and dynamic allocation (scheduling) of both uplink and downlink resources to a UE;
- IP header compression, encryption, and integrity protection of data;
- Selection of an AMF during UE attachment in such a case when no routing to an AMF can be determined from the information provided by the UE;
- Routing user plane data towards the UPF;
- Routing control plane information towards the AMF;
- Connection setup and release;
- Scheduling and transmission of paging messages;
- Scheduling and transmission of system broadcast information (originated from the AMF or an action management maintenance function (OAM: Operation, Admission, Maintenance));
- Measurement and measurement reporting configuration for mobility and scheduling;
- Transport level packet marking in the uplink;
- Session management;
- Support of network slicing;
- QoS flow management and mapping to data radio bearers;
- Support of UEs in the RRC_INACTIVE state;
- Distribution function for NAS messages;
- Radio access network sharing;
- Dual connectivity; and
- Tight interworking between NR and E-UTRA.

The Access and Mobility Management Function (AMF) hosts the following main functions:

- Function of Non-Access Stratum (NAS) signaling termination;
- NAS signaling security;
- Access Stratum (AS) security control;
- Inter-Core Network (CN) node signaling for mobility between 3GPP access networks;
- Idle mode UE reachability (including control and execution of paging retransmission);
- Registration area management;
- Support of intra-system and inter-system mobility;
- Access authentication;
- Access authorization including check of roaming rights;
- Mobility management control (subscription and policies);
- Support of network slicing;
- Session Management Function (SMF) selection.

In addition, the User Plane Function (UPF) hosts the following main functions:

- Anchor Point for intra-/inter-RAT mobility (when applicable);
- External Protocol Data Unit (PDU) session point for interconnection to a data network;
- Packet routing and forwarding;
- Packet inspection and a user plane part of Policy rule enforcement;
- Traffic usage reporting;
- Uplink classifier to support routing traffic flows to a data network;
- Branching point to support multi-homed PDU session;
- QoS handling for user plane (e.g., packet filtering, gating, UL/DL rate enforcement);
- Uplink traffic verification (SDF to QoS flow mapping); and
- Function of downlink packet buffering and downlink data notification triggering.

Finally, the Session Management Function (SMF) hosts the following main functions:

- Session management;
- UE IP address allocation and management;
- Selection and control of UPF;
- Configuration function for traffic steering at the User Plane Function (UPF) to route traffic to a proper destination;
- Control part of policy enforcement and QoS; and
- Downlink data notification.

<RRC Connection Setup and Reconfiguration Procedure>

Figure 17:
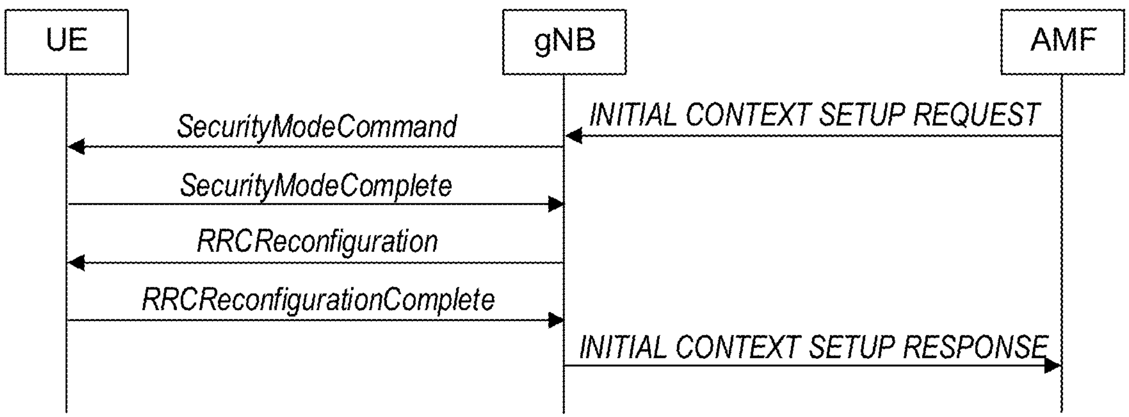
FIG. 17 is a sequence diagram for RRC connection setup/reconfiguration procedures.

FIG. 17 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a Security ModeCommand message and by the UE responding to the gNB with the Security ModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB informs the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which, in operation, transmits an initial context setup message to the gNodeB via the NG connection such that a signaling radio bearer between the gNodeB and a User Equipment (UE) is configured up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and beyond>

Figure 18:
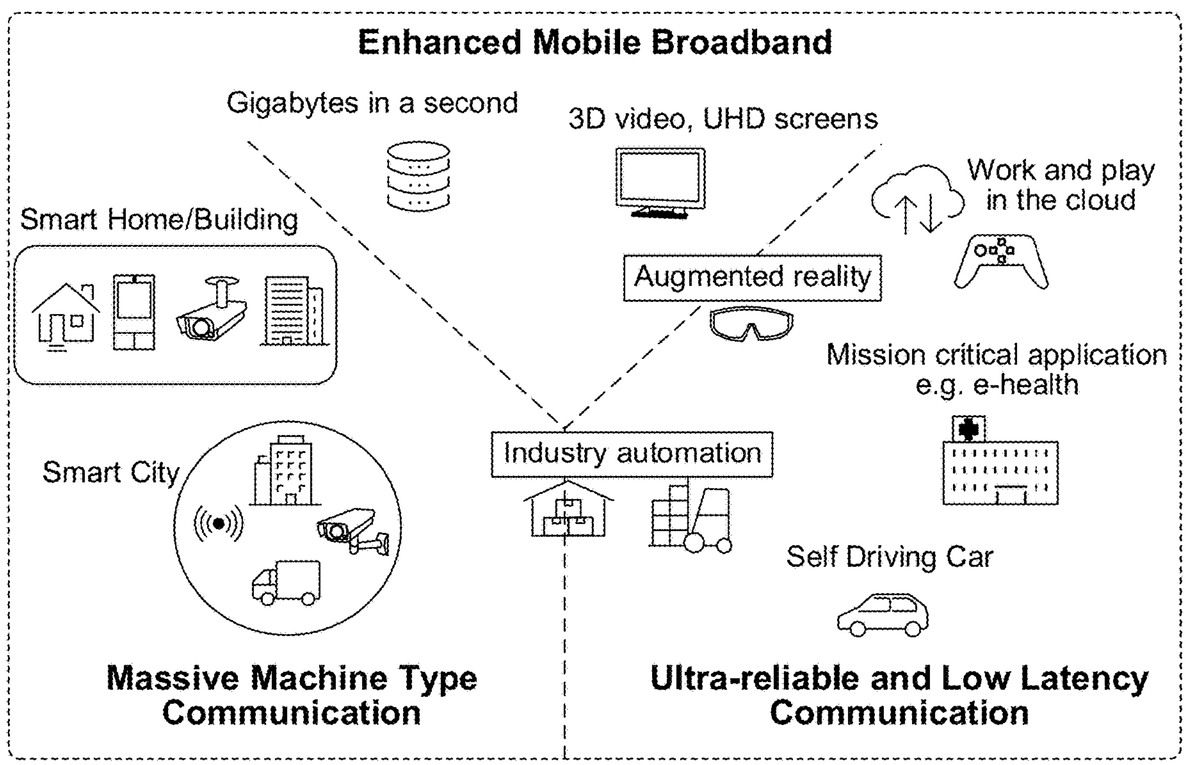
FIG. 18 schematically illustrates usage scenarios of enhanced Mobile BroadBand (eMBB), massive Machine Type Communications (mMTC), and Ultra Reliable and Low Latency Communications (URLLC)

FIG. 18 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 18 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements configured by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been identified such as factory automation, transport industry and electrical power distribution. The tighter requirements are higher reliability (up to 10-6 level), higher availability, packet sizes of up to 256 bytes, time synchronization down to the order of a few us where the value can be one or a few us depending on frequency range and short latency in the order of 0.5 to 1 ms in particular a target user plane latency of 0.5 ms, depending on the use cases. Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearer (DRB) together with the PDU Session, e.g., as illustrated above with reference to FIG. 17. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 19:
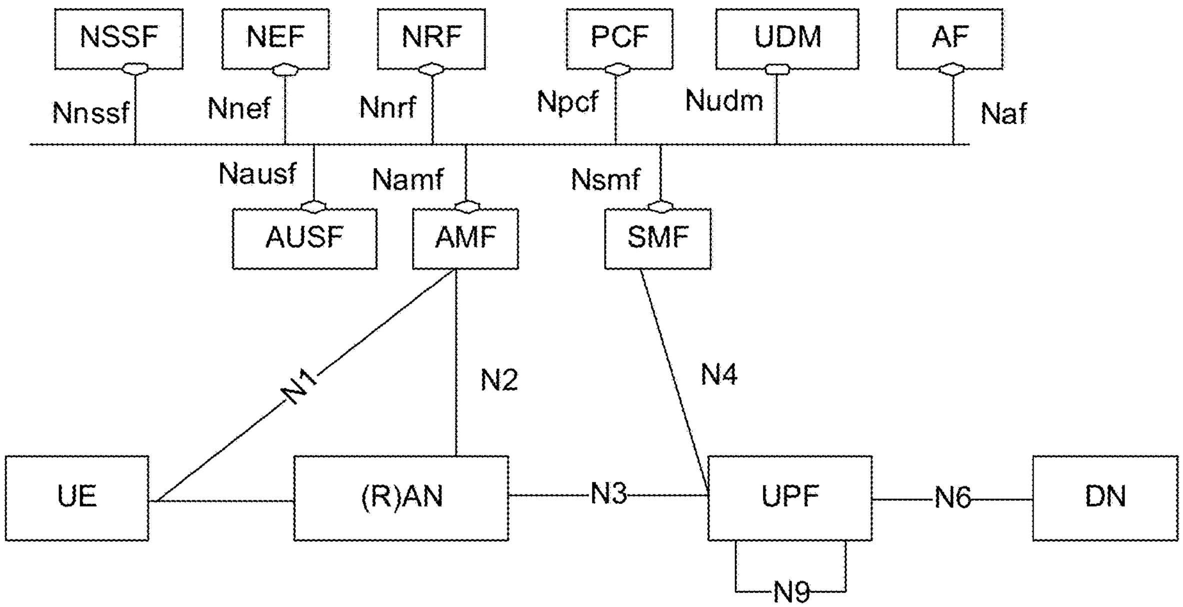
FIG. 19 is a block diagram illustrating an exemplary 5G system architecture for a non-roaming scenario.

FIG. 19 illustrates a 5G NR non-roaming reference architecture (see TS 23.501 v16.1.0, section 4.23). An Application Function (AF), e.g., an external application server hosting 5G services, exemplarily described in FIG. 18, interacts with the 3GPP Core Network in order to provide services, e.g., to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 19 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that includes: a transmitter, which, in operation, transmits a request containing a QoS requirement for at least one of URLLC, eMMB and mMTC services to at least one of functions (e.g., NEF, AMF, SMF, PCF, UPF, etc.) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to an embodiment of the present disclosure includes: control circuitry, which, in operation, determines an indication pattern based on a configuration regarding feedback for a retransmission process and configures the indication pattern in a signal indicating a number of assignments of data in the retransmission process; and transmission circuitry, which, in operation, transmits the indication pattern in the signal, in which at least one of a plurality of patterns associated with a first candidate value for a value related to the number of assignments of data in a retransmission process in which the feedback is enabled is associated with a second candidate value not included in the first candidate value, and the control circuitry determines that at least one of the plurality of patterns is the indication pattern, when indicating that the value related to the number of assignments of data in a retransmission process in which the feedback is disabled is the second candidate value.

In the base station according to the embodiment of the present disclosure, the first candidate value is an integer value equal to or greater than 1, and the second candidate value is 0.

In the base station according to an embodiment of the present disclosure, the signal is a signal indicating a downlink assignment indicator (DAI).

In the base station according to an embodiment of the present disclosure, the plurality of patterns corresponding to a number of bits used for indication of the DAI is respectively associated with a plurality of the first candidate values, and at least one of the plurality of patterns is associated with both one of the first candidate values and the second candidate value.

In the base station according to an embodiment of the present disclosure, the control circuitry associates the first candidate value and the second candidate value with the plurality of patterns using arithmetic that is based on a number of the plurality of patterns corresponding to a number of bits used for indication of the DAI.

In the base station according to an embodiment of the present disclosure, the control circuitry controls transmission of control information on the retransmission process in which the feedback is disabled.

A terminal according to an embodiment of the present disclosure includes: reception circuitry, which, in operation, receives an indication pattern determined based on a configuration regarding feedback for a retransmission process, in a signal indicating a number of assignments of data in the retransmission process; and control circuitry, which, in operation, controls reception of the data based on the indication pattern, in which a predetermined pattern among a plurality of patterns associated with a first candidate value for a value related to the number of assignments of data in a retransmission process in which the feedback is enabled is associated with a second candidate value not included in the first candidate value, and the control circuitry determines, when the indication pattern included in control information on a retransmission process in which the feedback is disabled indicates the predetermined pattern, the value related to the number of assignments of data indicated by the predetermined pattern, based on the control information on the retransmission process in which the feedback is enabled.

In the terminal according to an embodiment of the present disclosure, the control circuitry determines that the value indicated by the predetermined pattern is the second candidate value when at least one of a first condition and/or a second condition is satisfied, the first condition being that control information assigning a radio resource of the retransmission process in which the feedback is enabled is not received before the signal, and the second condition being that the control information including a signal in which a different pattern from the predetermined pattern is configured is not received before the signal.

In the terminal according to an embodiment of the present disclosure, the control circuitry determines that the value indicated by the predetermined pattern is a value associated with the predetermined pattern among a plurality of the first candidate values, when neither the first condition nor the second condition is satisfied.

In the terminal according to an embodiment of the present disclosure, the control circuitry controls reception of control information on the retransmission process in which the feedback is disabled.

In a communication method according to an embodiment of the present disclosure, a base station determines an indication pattern based on a configuration regarding feedback for a retransmission process, configures the indication pattern in a signal indicating a number of assignments of data in the retransmission process, transmits the indication pattern in the signal, associates at least one of a plurality of patterns associated with a first candidate value for a value related to the number of assignments of data in a retransmission process in which the feedback is enabled, with a second candidate value not included in the first candidate value, and determines that at least one of the plurality of patterns is the indication pattern, when indicating that the value related to the number of assignments of data in a retransmission process in which the feedback is disabled is the second candidate value.

In a communication method according to an embodiment of the present disclosure, a terminal receives an indication pattern determined based on a configuration regarding feedback for a retransmission process in a signal indicating a number of assignments of data in the retransmission process, controls reception of the data based on the indication pattern, associates a predetermined pattern of a plurality of patterns associated with a first candidate value for a value related to the number of assignments of data in a retransmission process in which the feedback is enabled, with a second candidate value not included in the first candidate value, and determines, when the indication pattern included in control information on a retransmission process in which the feedback is disabled indicates the predetermined pattern, the value related to the number of assignments of data indicated by the predetermined pattern, based on the control information on the retransmission process in which the feedback is enabled.

The disclosure of Japanese Patent Application No. 2021-129174, filed on Aug. 5, 2021, including the specification, drawings, and abstract, is incorporated herein by reference in its entirety.

INDUSTRIAL APPLICABILITY

One aspect of the present disclosure is useful for radio communication systems.

REFERENCE SIGNS LIST

100 Base station
101 Retransmission controller
102, 205 Encoder/modulator
103, 206 Radio transmitter
104, 201 Antenna
105, 202 Radio receiver
106, 203 Demodulator/decoder
107 HARQ-ACK determiner
200 Terminal
204 HARQ-ACK generator

The invention claimed is:

1. A base station, comprising:
control circuitry, which, in operation, determines an indication pattern based on a configuration regarding feedback for a retransmission process and configures the indication pattern in a signal indicating a number of assignments of data in the retransmission process; and
transmission circuitry, which, in operation, transmits the indication pattern in the signal, wherein
at least one of a plurality of patterns associated with a first candidate value for a value related to the number of assignments of data in a retransmission process in which the feedback is enabled is associated with a second candidate value different from the first candidate value;
the control circuitry, when indicating that the value related to the number of assignments of data in a retransmission process in which the feedback is disabled is the second candidate value, determines the at least one of the plurality of patterns is the indication pattern;
the signal is a signal indicating a downlink assignment indicator (DAI);
the plurality of patterns corresponding to a number of bits used for indication of the DAI are respectively associated with a plurality of the first candidate values; and
the at least one of the plurality of patterns is associated with both one of the plurality of first candidate values and the second candidate value.

2. The base station according to claim 1, wherein
the plurality of first candidate values include 1, 2, 3 and 4;
the plurality of patterns include 4 patterns respectively associated with the plurality of first candidate values of 1, 2, 3 and 4; and
the second candidate value is 0, and the at least one of the plurality of patterns is associate with the first candidate value of 1 and the second candidate value of 0.

3. The base station according to claim 1, wherein
the control circuitry associates the first candidate value and the second candidate value with the plurality of patterns using arithmetic that is based on a number of the plurality of patterns corresponding to a number of bits used for indication of the DAI.

4. The base station according to claim 1, wherein
the control circuitry controls transmission of control information on the retransmission process in which the feedback is disabled.

5. A terminal, comprising:
reception circuitry, which, in operation, receives an indication pattern determined based on a configuration regarding feedback for a retransmission process, in a signal indicating a number of assignments of data in the retransmission process; and
control circuitry, which, in operation, controls reception of the data based on the indication pattern, wherein
a predetermined pattern among a plurality of patterns associated with a first candidate value for a value related to the number of assignments of data in a retransmission process in which the feedback is enabled is associated with a second candidate value different from the first candidate value;
the control circuitry, when the indication pattern included in control information on a retransmission process in which the feedback is disabled indicates the predetermined pattern, determines, based on the control information on the retransmission process in which the feedback is enabled, the value related to the number of assignments of data indicated by the predetermined pattern;
the signal is a signal indicating a downlink assignment indicator (DAI);
the plurality of patterns corresponding to a number of bits used for indication of the DAI are respectively associated with a plurality of the first candidate values; and
the at least one of the plurality of patterns is associated with both one of the plurality of first candidate values and the second candidate value.

6. The terminal according to claim 5, wherein
the control circuitry determines that the value indicated by the predetermined pattern is the second candidate value when at least one of a first condition and/or a second condition is satisfied, the first condition being that control information assigning a radio resource of the retransmission process in which the feedback is enabled is not received before the signal, and the second condition being that the control information including a signal in which a different pattern from the predetermined pattern is configured is not received before the signal.

7. The terminal according to claim 6, wherein
the control circuitry determines that the value indicated by the predetermined pattern is a value associated with the predetermined pattern among a plurality of the first candidate values, when neither the first condition nor the second condition is satisfied.

8. The terminal according to claim 5, wherein
the control circuitry controls reception of the control information on the retransmission process in which the feedback is disabled.

9. A communication method, comprising:
determining, by a base station, an indication pattern based on a configuration regarding feedback for a retransmission process;
configuring, by the base station, the indication pattern in a signal indicating a number of assignments of data in the retransmission process;
transmitting, by the base station, the indication pattern in the signal;

associating, by the base station, at least one of a plurality of patterns associated with a first candidate value for a value related to the number of assignments of data in a retransmission process in which the feedback is enabled, with a second candidate value different from the first candidate value; and determining, by the base station when indicating that the value related to the number of assignments of data in a retransmission process in which the feedback is disabled is the second candidate value, the at least one of the plurality of patterns is the indication pattern; wherein the signal is a signal indicating a downlink assignment indicator (DAI);

the plurality of patterns corresponding to a number of bits used for indication of the DAI are respectively associated with a plurality of the first candidate values; and the at least one of the plurality of patterns is associated with both one of the plurality of first candidate values and the second candidate value.

10. A communication method, comprising:

receiving, by a terminal, an indication pattern determined based on a configuration regarding feedback for a retransmission process in a signal indicating a number of assignments of data in the retransmission process;

controlling, by the terminal, reception of the data based on the indication pattern;

associating, by the terminal, a predetermined pattern of a plurality of patterns associated with a first candidate value for a value related to the number of assignments of data in a retransmission process in which the feedback is enabled, with a second candidate value different from the first candidate value; and when the indication pattern included in control information on a retransmission process in which the feedback is disabled indicates the predetermined pattern, determining, by the terminal, based on the control information on the retransmission process in which the feedback is enabled, the value related to the number of assignments of data indicated by the predetermined pattern; wherein the signal is a signal indicating a downlink assignment indicator (DAI);

the plurality of patterns corresponding to a number of bits used for indication of the DAI are respectively associated with a plurality of the first candidate values; and the at least one of the plurality of patterns is associated with both one of the plurality of first candidate values and the second candidate value.

* * * * *